(12) United States Patent
Maeda

(10) Patent No.: US 8,246,177 B2
(45) Date of Patent: Aug. 21, 2012

(54) LIGHTING UNIT AND PROJECTION DISPLAY APPARATUS

(75) Inventor: Makoto Maeda, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 932 days.

(21) Appl. No.: 12/325,443

(22) Filed: Dec. 1, 2008

(65) Prior Publication Data

US 2009/0140974 A1 Jun. 4, 2009

(30) Foreign Application Priority Data

Nov. 30, 2007 (JP) ................................. 2007-311511
Nov. 25, 2008 (JP) ................................. 2008-300205

(51) Int. Cl.
*G03B 21/28* (2006.01)

(52) U.S. Cl. ................ 353/99; 353/30; 353/31; 353/33; 353/37; 353/38; 353/70; 353/81; 353/88; 353/89; 353/98; 353/102

(58) Field of Classification Search .................... 353/30, 353/31, 33, 37, 38, 70, 81, 88, 89, 98, 99, 353/102, 94; 359/223.1, 224.1, 290, 291, 359/295, 846, 849, 850, 855; 362/268, 282, 362/322, 276, 297; 349/5, 7, 8, 9, 42, 46, 349/30, 114–115; 348/750, 752, 762, 771, 348/800–803

See application file for complete search history.

(56) References Cited

U.S. PATENT DOCUMENTS

| 6,157,420 | A  | * | 12/2000 | Nakanishi et al. | ................ | 349/9 |
| 6,278,542 | B1 | * | 8/2001 | Hewlett | ........................ | 359/291 |
| 6,327,093 | B1 | * | 12/2001 | Nakanishi et al. | ............ | 359/634 |
| 6,769,772 | B2 | * | 8/2004 | Roddy et al. | .................... | 353/31 |
| 7,270,427 | B2 | * | 9/2007 | Sakata | ............................ | 353/94 |
| 7,419,265 | B2 | * | 9/2008 | Relke et al. | ........................ | 353/7 |
| 8,004,740 | B2 | * | 8/2011 | Aksamit et al. | ................ | 359/267 |
| 2005/0128441 | A1 | * | 6/2005 | Morgan | ........................ | 353/102 |
| 2006/0028625 | A1 | * | 2/2006 | Miyazawa | ...................... | 353/94 |
| 2006/0044525 | A1 | * | 3/2006 | Lee et al. | ........................ | 353/81 |
| 2007/0014114 | A1 | * | 1/2007 | Barazza | ........................ | 362/297 |
| 2008/0136990 | A1 | * | 6/2008 | Kimura | ............................ | 349/46 |
| 2009/0091718 | A1 | * | 4/2009 | Obi et al. | ........................ | 355/30 |

FOREIGN PATENT DOCUMENTS

JP 07-318883 A 12/1995
JP 2002-287247 A 10/2002

* cited by examiner

*Primary Examiner* — Georgia Y Epps
*Assistant Examiner* — Sultan Chowdhury
(74) *Attorney, Agent, or Firm* — Marvin A. Motsenbocker; Mots Law, PLLC

(57) ABSTRACT

The lighting unit includes the DMDs (80R), (80G), and (80B). The lighting unit also includes: the prisms (50) and (60) combining the light emitted from the DMDs (80R), (80G), and (80B); and the light modulating optical device (90G). The incident light including the green component light and the yellow component light enters the light modulating optical device (90G). The light modulating optical device (90G) transmits the green component light and changes a transmittance of the yellow component light depending on a change of a molecular state. Light having emitted from the light modulating optical device (90G) enters the DMD (80G), which corresponds to the incident light.

9 Claims, 17 Drawing Sheets

TCNQ: TETRACYANO-QUINODIMETHANE       TTF: TETRATHIOFULVALENE

APPLY LOW VOLTAGE     STATE IN WHICH LIGHT TRANSMITS THROUGH

FOCAL CONIC STATE

APPLY HIGH VOLTAGE     STATE IN WHICH LIGHT IS REFLECTED

PLANAR STATE

OFF STATE

ON STATE

LIGHTING UNIT AND PROJECTION DISPLAY APPARATUS

BACKGROUND OF THE INVENTION

1. Field of the Invention

The present invention relates to a lighting unit and a projection display apparatus, each including a red light imager modulating red component light, a green light imager modulating green component light, and a blue light imager modulating blue component light.

2. Description of the Related Art

Heretofore, a projection display apparatus has been known which includes: three light imagers corresponding to light of three colors (red component light, green component light, and blue component light); a cross dichroic cube combining light emitted from the three light imagers; and a projection unit projecting the light combined by the cross dichroic cube.

Here, consider a projection display apparatus using a light source which emits white light like a lamp in terms of the improvement of luminance and the improvement of color purity. As for the improvement of luminance, it is preferable (1) to widen a band of each color component light used in the projection display apparatus, and (2) to use a fourth color component (e.g., yellow component light) other than the red component light, the green component light, and the blue component light. Meanwhile, as for the improvement of color purity, it is preferable (1) to narrow a band of each color component light used in the projection display apparatus, and (2) not to use a fourth color component (e.g., yellow component light) other than the red component light, the green component light, and the blue component light. Therefore, there is a trade-off between the improvement of luminance and the improvement of color purity.

Under such circumstances, the following, for example, have been proposed: (1) a four-panel projection display apparatus provided with a light imager which modulates fourth color component light (for example, Japanese Patent Application 1), and (2) a projection display apparatus provided with a movable dichroic mirror which cuts off fourth color component light (for example, Japanese Unexamined Patent Application 2).

Moreover, it is also possible to design a projection display apparatus having a digital micromirror device (DMD) by providing a movable dichroic mirror thereto. In this case, the projection display apparatus can be configured to be switchable between a luminance improvement mode and a color purity improvement mode by use of the movable dichroic mirror. [Japanese Patent Application 1: Publication No. 2002-287247] [Japanese Unexamined Patent Application 2: Publication No. Hei 7-318883]

However, a four-panel projection display apparatus is not capable of combining light of four or more colors by using a single cross dichroic cube. Accordingly, the projection display apparatus needs to have two or more dichroic cubes (or cross dichroic cubes) and thereby to have a long back-focus of a projection unit.

Consequently, a projection unit used for the projection display apparatus using light of three colors cannot be used for the four-panel projection display apparatus, so that cost of the projection display apparatus as a whole increases.

Meanwhile, in a projection display apparatus provided with a movable dichroic mirror, a failure tends to occur because the dichroic mirror needs to be mechanically moved.

SUMMARY OF THE INVENTION

An aspect of a lighting unit of the invention is as follows. The lighting unit includes: a light source (a light source 10) configured to emit light including at least red component light, green component light, and blue component light; a red light imager (a DMD 80R or a liquid crystal panel 240R) configured to modulate the red component light; a green light imager (a DMD 80G and a liquid crystal panel 240G) configured to modulate the green component light; and a blue light imager (a DMD 80B or a liquid crystal panel 240B) configured to modulate the blue component light. The lighting unit includes: a color combining unit (prisms 50 and 60, and a color combining unit 250) configured to combine light emitted from the red light imager, the green light imager, and the blue light imager; and a light modulating optical device (for example, light modulating optical devices 90, 290, 312, and 400) configured to have a structure in which a device state reversibly changes depending on an application voltage to be applied to the light modulating optical device. Incident light having a first waveband and incident light having a second waveband enter the light modulating optical device. The light modulating optical device changes a transmittance or a reflectance of the light having the second waveband depending on the device state, without changing the transmittance of the reflectance of the light having the first waveband. Light having emitted from the light modulating optical device enters a particular one of the red light imager, the green light imager, and the blue light imager, which corresponds to the incident light.

According to the above aspect, the light modulating optical device changes the transmittance of light having a second waveband depending on a change of a molecular state. Light having transmitted through the light modulating optical device enters a particular light imager.

Accordingly, it becomes possible to electrically switch the waveband of light entering the particular light imager while considering the improvement of luminance and color purity, without the need of a mechanical configuration.

In the above-described aspect, the incident light includes particular color component light which is any one of the red component light, the green component light, and the blue component light. The light modulating optical device has a function for controlling the color purity of the particular color component light.

In the above-described aspect, the light having the first waveband is particular color component light which is any one of the red component light, the green component light, and the blue component light. The light having the second waveband is fourth color component light other than the red component light, the green component light, and the blue component light. The light modulating optical device has a function for controlling an amount of the fourth color component light.

In the above-described aspect, the incident light further includes light having a third waveband. The second waveband is a waveband between the first waveband and the third waveband. The light modulating optical device reflects light having the third waveband, and reflects both the light having the second waveband and the light having the third waveband when not transmitting the light having the second waveband. Each of the light having the first waveband and the light having the third waveband is any one of the red component light, the green component light, and the blue component light. The light having the second waveband is fourth color component light other than the red component light, the green component light, and the blue component light. The light modulating optical device has a function for separating the light having the first waveband and the light having the third waveband from each other.

In the above-described aspect, the lighting unit further includes a controlling unit configured to control modulation amounts of the red light imager, the green light imager, and the blue light imager in response to a red input signal, a green input signal, and a blue input signal. Based on the red input signal, the green input signal, and the blue input signal, the controlling unit controls an application voltage to be applied to the light modulating optical device.

In the above-described aspect, a resolution of the light modulating optical device is lower than those of the red light imager, the green light imager, and the blue light imager.

In the above-described aspect, the light modulating optical device is an electrochromic device.

In the above-described aspect, the light modulating optical device includes: cholesteric liquid crystals which transmit the light having the first waveband and which change the transmittance of the light having the second waveband depending on a change of the device state; and a dielectric multilayer film which reflects the light having the third waveband and transmits the light having the first waveband and the light having the second waveband. The cholesteric liquid crystals reflect the light having the second waveband when not transmitting the light having the second waveband. The dielectric multilayer film is provided on the light emitting side of the cholesteric liquid crystals.

An aspect of a projection display apparatus of the invention is as follows. The projection display apparatus includes: a light source (a light source 10) configured to emit light including at least red component light, green component light, and blue component light; a red light imager (a DMD 80R or a liquid crystal panel 240R) configured to modulate the red component light; a green light imager (a DMD 80G and a liquid crystal panel 240G) configured to modulate the green component light; and a blue light imager (a DMD 80B or a liquid crystal panel 240B) configured to modulate the blue component light. The lighting unit includes: a color combining unit (prisms 50 and 60, and a color combining unit 250) configured to combine light emitted from the red light imager, the green light imager, and the blue light imager; a projection unit (a projection lens unit 95) configured to project light combined by the color combining unit; and a light modulating optical device (light modulating optical devices 90, 290, and 312) configured to have a structure in which a device state reversibly changes depending on an application voltage to be applied to the light modulating optical device. Incident light having a first waveband and incident light having a second waveband enter the light modulating optical device. The light modulating optical device changes a transmittance or a reflectance of the light having the second waveband depending on the device state, without changing the transmittance of the reflectance of the light having the first waveband. Light having emitted from the light modulating optical device enters a particular one of the red light imager, the green light imager, and the blue light imager, which corresponds to the incident light.

DETAILED DESCRIPTION OF THE PREFERRED EMBODIMENTS

Figure 1:
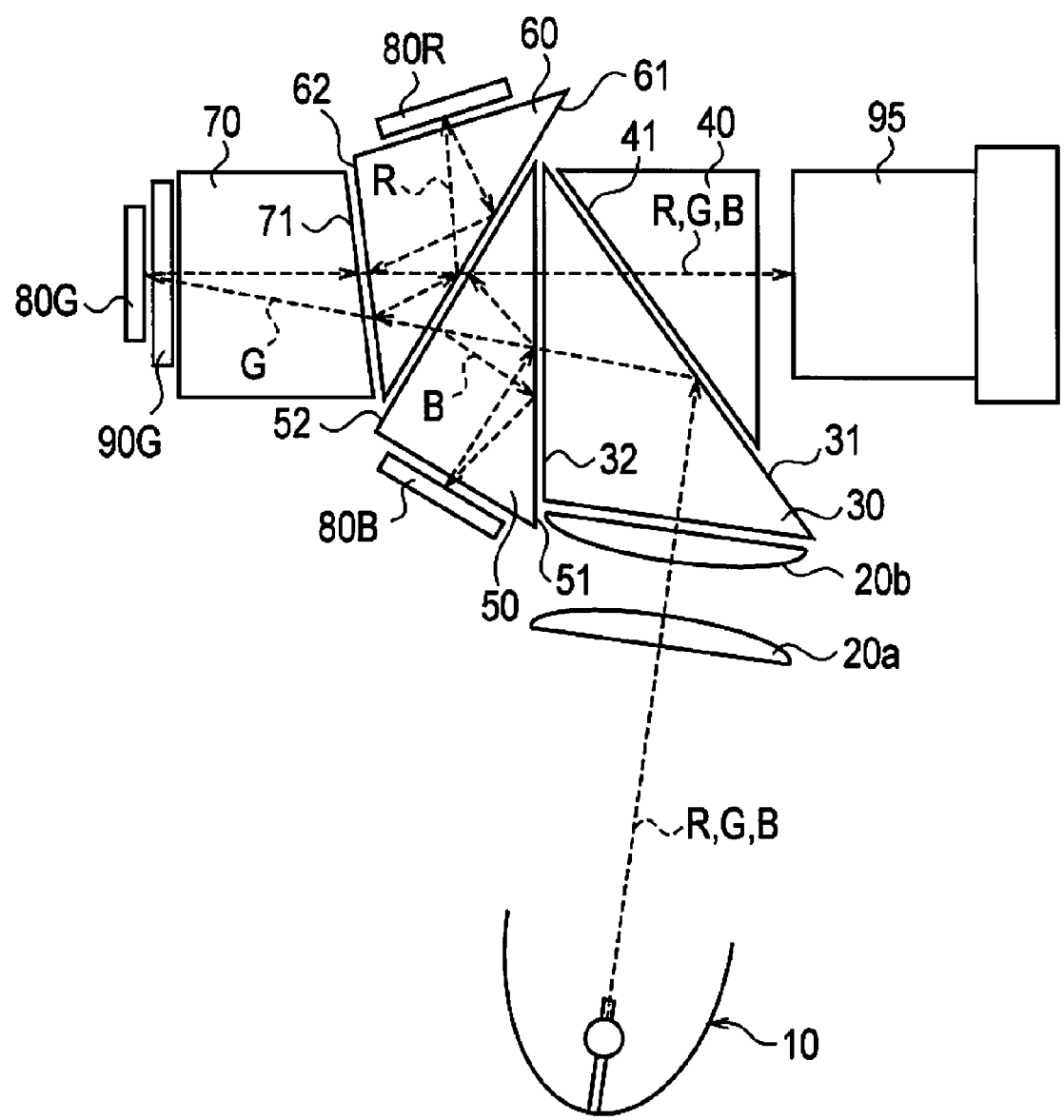
FIG. 1 is a schematic view showing a projection display apparatus 100 of a first embodiment.

Projection display apparatus according to embodiments of the present invention are described below with reference to the accompanying drawings. Throughout the drawings, identical or similar parts are denoted by identical or similar reference numerals.

It should be noted, however, that the drawings are schematic, and therefore dimensions and ratios are different from actual ones. Therefore, specific dimensions and the like should be determined based on the following description. Naturally, the dimensional relationships and dimensional ratios may be different from one drawing to another in some parts.

First Embodiment

Projection Display Apparatus

A projection display apparatus of a first embodiment of the present invention is described below with reference to drawings. FIG. 1 is a schematic view of a projection display apparatus 100 of the first embodiment. In this embodiment, an example of the projection display apparatus 100 corresponding to Digital Light Processing (hereinafter, referred to as DLP) system (registered trademark) is shown.

Incidentally, it should be noted that a fly eye lens, a rod integrator, or the like which uniformizes light emitted from a light source 10 is omitted in FIG. 1.

As shown in FIG. 1, the projection display apparatus 100 includes the light source 10, a lens group (lenses 20a and 20b), prisms 30, 40, 50, 60, and 70, multiple Digital Micromirror Devices (DMDs) DMDs 80R, 80G, and 80B, a light modulating optical device 90G, and a projection lens unit 95.

Incidentally, in the first embodiment, the light source 10, the respective prisms, the respective DMDs, and the light modulating optical device 90G constitute a lighting unit. That is, the lighting unit includes a configuration in which the projection lens unit 95 is removed from the projection display apparatus 100.

The light source 10 is a UHP lamp emitting white light, or the like. That is, light emitted from the light source 10 includes red component light, green component light, and blue component light. Note that the green component light includes light (yellow component light) having a waveband corresponding to a yellow color, in addition to light having a waveband corresponding to a green color.

Figure 2:
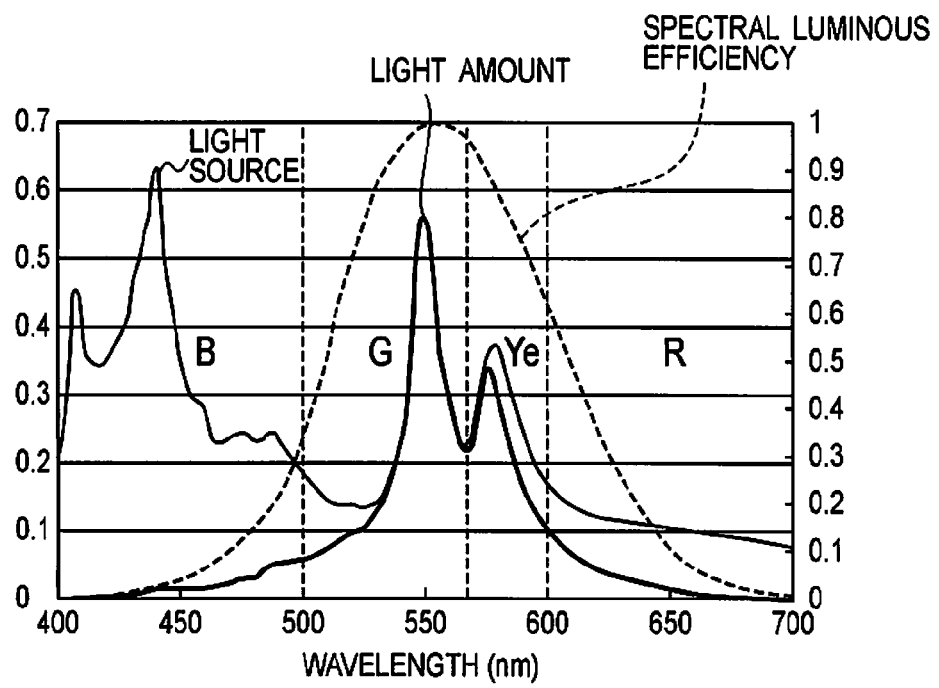
FIG. 2 is a view for describing light emitted from a light source 10 of the first embodiment.

With reference to FIG. 2, a specific description will be given with regard to light emitted from the light source 10. Here, an amount of light is derived from a product of the energy of light emitted from the light source 10 and a spectral luminous efficiency.

As shown in FIG. 2, the spectral luminous efficiency tends to attain its peak on a waveband corresponding to a green color, and to decrease as it approaches a shorter wavelength (blue) or a longer wavelength (red). Therefore, even when the energy of light emitted from the light source 10 such as the UHP lamp attains its peaks in the vicinities of 440 nm (blue), 550 nm (green), and 580 nm (yellow) in this order, an amount of light emitted from the light source 10 takes a largest value on a waveband corresponding to a green color. Further, the amount of light emitted from the light source 10 takes a large value on a waveband corresponding to a yellow color next to the waveband corresponding to a green color.

Thus, it can be seen that the light emitted from the waveband corresponding to a yellow color greatly contributes to the light amount of an image in terms of the energy of light emitted from the light source 10 and the spectral luminous efficiency.

The lenses 20a and 20b are condenser lenses which substantially parallelize light emitted from the light source 10 so that each color component light is illuminated onto the corresponding DMD.

The prism 30 is formed of a transparent member, and includes surfaces 31 and 32. An air gap is provided between the prism 30 (surface 31) and the prism 40 (surface 41). Since an angle (an incident angle) at which light emitted from the light source 10 enters the surface 31 is larger than a total reflection angle, the light emitted from the light source 10 reflects on the surface 31. Meanwhile, an air gap is provided between the prism 30 (surface 32) and the prism 50 (surface 51). Since an angle (an incident angle) at which light emitted from the light source 10 enters the surface 32 is smaller than a total reflection angle, the light reflected from the surface 31 transmits through the surface 32.

The prism 40 is formed of a transparent member, and includes the surface 41.

The prism 50 is formed of a transparent member, and includes surfaces 51 and 52. An air gap is provided between the prism 30 (surface 32) and the prism 50 (surface 51). Since angles (incident angles) at which blue component light reflected from the surface 52 and blue component light emitted from the DMD 80B enter the surface 51 are larger than a total reflection angle, the blue component light reflected from the surface 52 and the blue component light emitted from the DMD 80B are reflected on the surface 51.

The surface 52 is a dichroic filter surface that transmits red component light and green component light, and that reflects blue component light. Accordingly, among light beams reflected from the surface 31, red component light and green component light transmit through the surface 52, and blue component light is reflected on the surface 52. The blue component light reflected from the surface 51 is reflected on the surface 52.

The prism 60 is formed of a transparent member, and includes surfaces 61 and 62. An air gap is provided between the prism 50 (surface 52) and the prism 60 (surface 61). Since angles (incident angles) at which red component light reflected from the surface 62 and red component light emitted from the DMD 80R enter the surface 61 are larger than a total reflection angle, the surface 61 reflects red component light transmitted through the surface 61 and reflected from the surface 62, and red component light emitted from the DMD 80R. Meanwhile, an angle (an incident angle) at which red component light reflected from the surface 61 and then reflected from the surface 62 enters the surface 61 is larger than a total reflection angle, so that the red component light reflected from the surface 61 and then reflected from the surface 62 transmits through the surface 61.

The surface 62 is a dichroic filter surface that transmits green component light, and that reflects red component light. Accordingly, among light beams having transmitted through the surface 61, green component light transmits through the surface 62, and red component light is reflected on the surface 62. The red component light reflected from the surface 61 is reflected on the surface 62. Green component light emitted from the DMD 80G transmits through the surface 62.

Here, the prism 50 separates combined light of red component light and green component light, and blue component light, with the surface 52. The prism 60 separates red component light and green component light, with the surface 62. That is, the prisms 50 and 60 function as color separators separating component light of respective colors.

Incidentally, in the first embodiment, a cutoff wavelength of the surface 52 of the prism 50 is provided between a waveband corresponding to a green color and a waveband corresponding to a blue color. A cutoff wavelength of the surface 62 of the prism 60 is provided between a waveband corresponding to a red color and a waveband corresponding to a green color. To be more specific, a cutoff wavelength of the surface 62 of the prism 60 is provided between a waveband corresponding to a red color and a waveband corresponding to a yellow color.

Meanwhile, the prism 50 combines combined light of red component light and green component light, and blue component light, with the surface 52. The prism 60 combines red component light and green component light, with the surface 62. That is, the prisms 50 and 60 function as color combining devices combining light of respective colors.

The prism 70 is formed of a transparent member, and includes a surface 71. An air gap is provided between the prism 60 (surface 62) and the prism 70 (surface 71). Since an angle (an incident angle) at which green component light emitted from the DMD 80G enters the surface 71 is smaller than a total reflection angle, the green component light emitted from the DMD 80G transmits through the surface 71.

The DMDs 80R, 80G, and 80B each include multiple micro-mirrors, which are movable. Each micro-mirror, basically, corresponds to one pixel. By changing the angle of each micro-mirror, the DMD 80R switches whether to reflect red component light to the side of the projection lens unit 95. Similarly, by changing the angle of each micro-mirror, the DMDs 80G and 80B switch whether to reflect green component light and blue component light to the side of the projection lens unit 95.

The light modulating optical device 90G has a structure in which a device state (here, a molecular state) reversibly changes depending on an application voltage to be applied to the light modulating optical device 90G. The light modulating optical device 90G transmits light (green component light) having a first waveband between incident light beams (green component light and yellow component light) regardless of a change of a molecular state. According to the change of a molecular state, the light modulating optical device 90G changes a transmittance of light (yellow component light) having a second waveband between the incident light beams (green component light and yellow component light). It should be noted that the light modulating optical device 90G does not change the transmittance of light having the first waveband.

Figure 4:
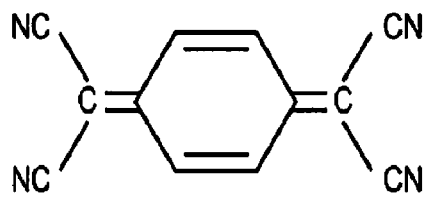
FIG. 4 is a view for describing a molecular structure of a light modulating optical device of the first embodiment.
Figure 4:
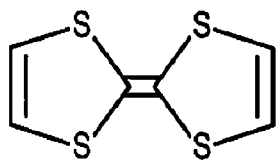
Figure 5:
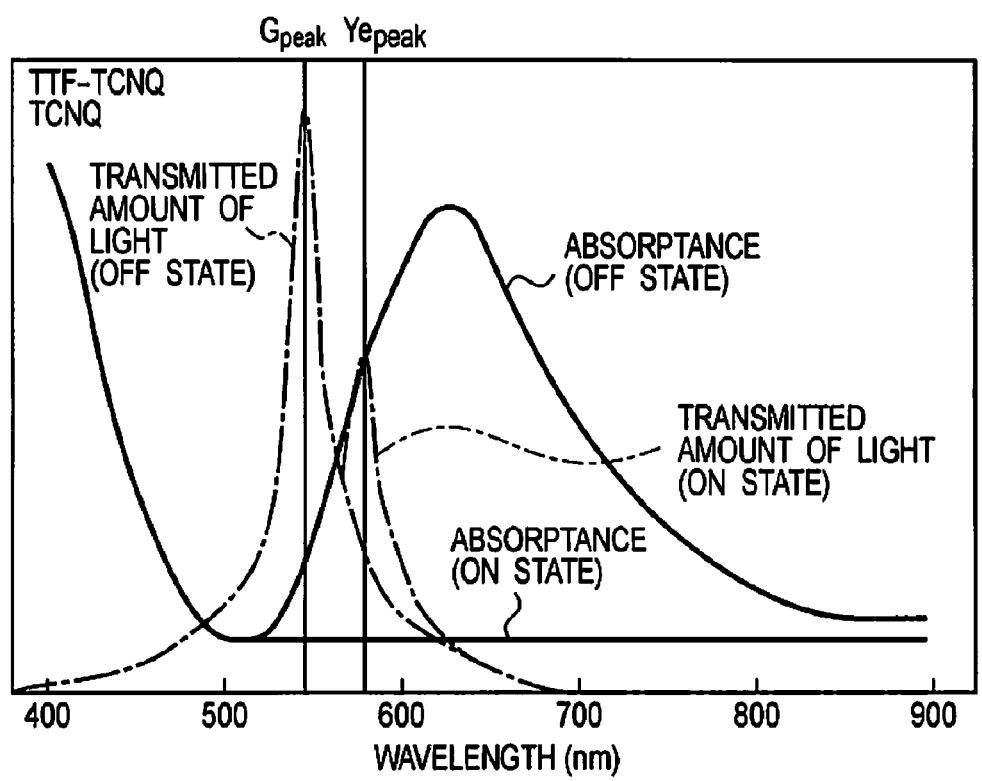
FIG. 5 is a view for describing operation of the light modulating optical device of the first embodiment.

Thus, the light modulating optical device 90G includes a function that controls an amount of yellow component light entering the DMD 80G by controlling a waveband of an incident light entering the DMD 80G. Incidentally, details of the light modulating optical device 90G are described later (FIGS. 3 to 5).

As described above, in the first embodiment, green component light includes light (yellow component light) having a waveband corresponding to a yellow color, in addition to light having a waveband corresponding to a green color. The first waveband is a waveband corresponding to a green color, and the second waveband is a waveband corresponding to a yellow color.

The projection lens unit 95 projects combined light of light beams emitted from the DMDs, on a screen (not shown).

(Light Modulating Optical Device)

First, function of a light modulating optical device (light modulating optical device 90G) of the first embodiment is described with reference to FIGS. 3A and 3B.

Figure 3A:
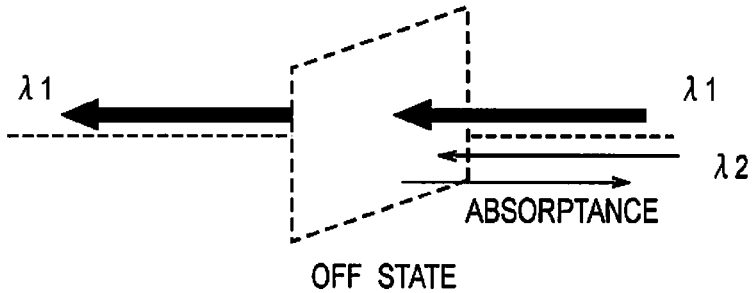
FIGS. 3A and 3B are views for describing function of a light modulating optical device of the first embodiment.

As shown in FIG. 3A, when not being applied with a voltage (hereinafter, referred to as OFF state), the light modulating optical device transmits light having a first waveband $\lambda 1$, and absorbs (reflects or diffracts) light having a second waveband $\lambda 2$.

Figure 3B:
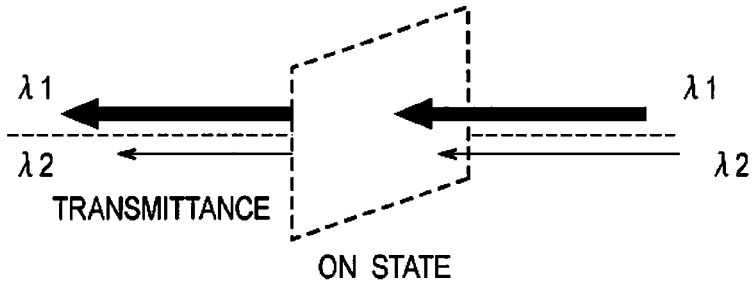

Meanwhile, as shown in FIG. 3B, when being applied with a voltage (hereinafter, referred to as ON state), the light modulating optical device transmits both of the light having the first waveband $\lambda 1$ and light having the second waveband $\lambda 2$.

Second, a molecular structure form of the light modulating optical device (light modulating optical device 90G) of the first embodiment is described with reference to FIG. 4. The light modulating optical device has a molecular structure including tetracyano-quinodimethane (TCNQ) shown in FIG. 4 and tetrathiofulvalene (TTF). More specifically, the light modulating optical device has a membrane structure in which TCNQ are scattered in a TTF-TCNQ complex by means of a vapor codeposition of the TTF-TCNQ complex and the TCNQ. The complex is a molecular compound formed by a coordinate bond or a hydrogen bond.

Third, operation of the light modulating optical device (light modulating optical device 90G) of the first embodiment is described with reference to FIG. 5. FIG. 5 shows an absorptance (ON state/OFF state) of light entering the light modulating optical device, and a transmitted amount of light (ON state/OFF state) entering the light modulating optical device.

As shown in FIG. 5, in ON state, the absorptance decreases from the side of a shorter wavelength until the wavelength attains 500 nm, and becomes constant at a low level of the absorptance on the side of a longer wavelength than 500 nm. Accordingly, the amount of light of the light modulating optical device has a peak value not only on a wavelength ($G_{peak}$) corresponding to a green color, but also on a wavelength ($Ye_{peak}$) corresponding to a yellow color.

In the meantime, in OFF state, the absorptance decreases from the side of a shorter wavelength until the wavelength attains 500 nm, but increases again on the side of a longer wavelength than 500 nm. Accordingly, the amount of light of the light modulating optical device has a peak value on a wavelength ($G_{peak}$) corresponding to a green color, and monotonically decreases on the side of a longer wavelength than the wavelength ($G_{peak}$). That is, the absorptance of the light modulating optical device does not have a peak value on the wavelength ($Ye_{peak}$) corresponding to a yellow color.

In this manner, in ON state, the light modulating optical device transmits both the light having the first waveband $\lambda 1$ (a waveband corresponding to a green color) and the light having the second waveband $\lambda 2$ (a waveband corresponding to a yellow color). Meanwhile, in OFF state, the light modulating optical device transmits the light having the first waveband $\lambda 1$ (a waveband corresponding to a green color), but absorbs the light having the second waveband $\lambda 2$ (a waveband corresponding to a yellow color).

(Function of the Projection Display Apparatus)

Figure 6:
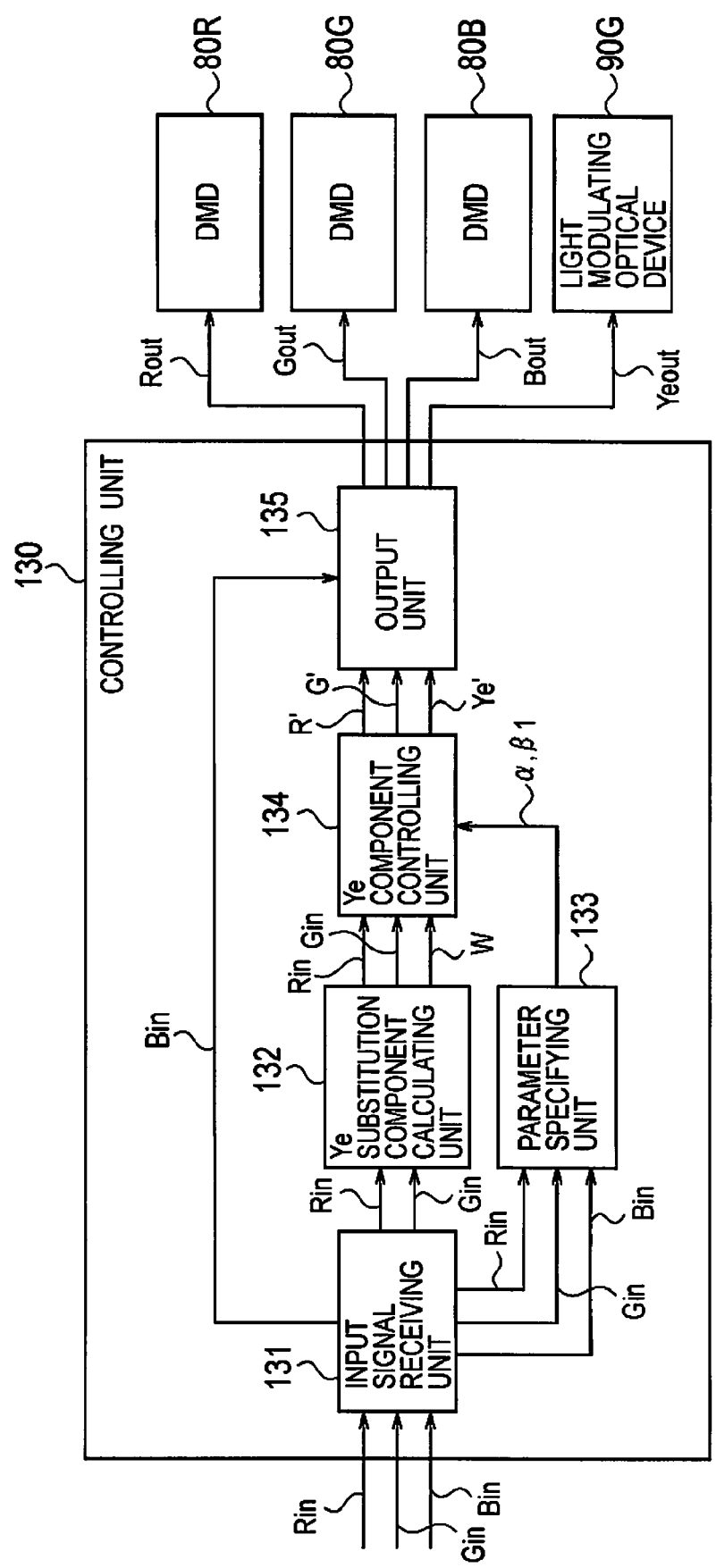
FIG. 6 is a view showing function of the projection display apparatus 100 of the first embodiment.

Functions of the projection display apparatus of the first embodiment are described below with reference to the drawings. FIG. 6 is a block diagram showing functions of the projection display apparatus 100 (a controlling unit 130) of the first embodiment.

Note that, in the first embodiment, the light (yellow component light) having the wavelength corresponding to a yellow color is included in green component light, as described above. Green component light including yellow component light enters the light modulating optical device 90G.

As shown in FIG. 6, the controlling unit 130 includes an input signal receiving unit 131, a Ye substitution component calculating unit 132, a parameter specifying unit 133, a Ye component controlling unit 134, and an output unit 135.

The input signal receiving unit 131 acquires a red input signal Rin, a green input signal Gin, and a blue input signal Bin. The input signal receiving unit 131 inputs the red input signal Rin, the green input signal Gin, and the blue input signal Bin into the parameter specifying unit 133. The input signal receiving unit 131 inputs the red input signal Rin and the green input signal Gin into the Ye substitution component calculating unit 132.

The Ye substitution component calculating unit 132 calculates a Ye substitution signal W corresponding to a component (a Ye substitution component) which is substitutable for red component light and green component light by using yellow component light.

Here, red component light and green component light are substitutable by yellow component light the light amount of which is equal to that of the red and green component light. Accordingly, the red input signal $R_{in}$ and the green input signal Gin are substitutable by the Ye substitution signal W having a signal intensity equal to that of the red input signal Rin and the green input signal Gin.

Therefore, based on the red input signal Rin and the green input signal Gin, the Ye substitution component calculating unit 132 calculates the Ye substitution signal W, according to the following (Equation 1).

[Formulae 1]

$$W = \min(R_{in}, G_{in}) \qquad \text{(Equation 1)}$$

Incidentally, min ($R_{in}$, $G_{in}$) is an input signal having the lower signal intensity between the red input signal $R_{in}$ and the green input signal Gin.

The Ye substitution component calculating unit 132 inputs the red input signal $R_{in}$, the green input signal Gin, and the Ye substitution signal W into the Ye component controlling unit 134.

The parameter specifying unit 133 calculates chromatins and luminance of an image (red, green, blue, and yellow) to be reproduced with the red input signal Rin, the green input signal Gin, and the blue input signal Bin. Subsequently, referring to FIGS. 7A to 7C, the parameter specifying unit 133 specifies various parameters (a color reproduction parameter α, a luminance parameter $β_1$, and a luminance parameter $β_2$), and inputs the specified various parameters into the Ye component controlling unit 134.

Figure 7A:
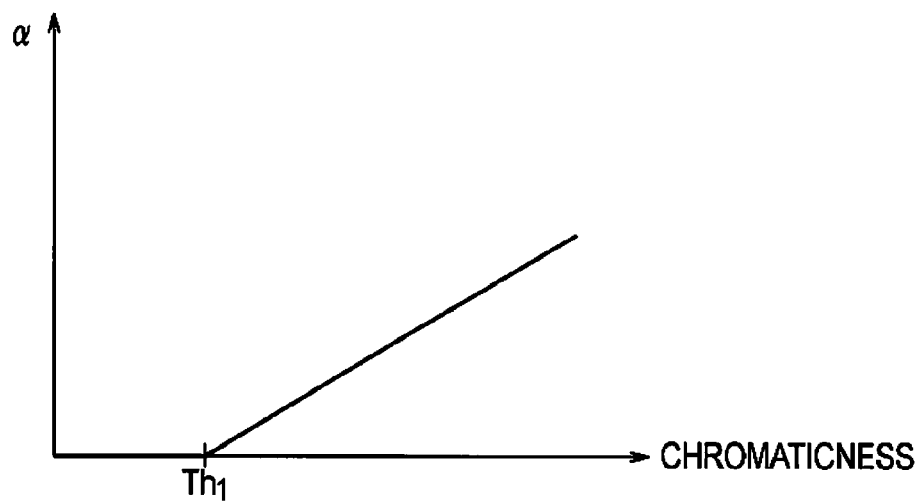
FIGS. 7A, 7B, and 7C are views for describing various coefficients of the first embodiment.

To be more specific, as shown in FIG. 7A, the color reproduction parameter a remains constant until the chromatins of an image (yellow in particular) attains $TH_z$. Meanwhile, the color reproduction parameter α is set so as to increase along with increase of the chromatins of the image after the chromatins of the image exceeds $TH_z$. That is, the color reproduction parameter α is set so that when a distance between the chromatins of an image and a white point is larger than a certain amount, the further the chromatins of the image moves away from the white point, the more the light amount of yellow component light increases. Thus, a yellow color in a range not reproducible neither with red component light nor with green component light is reproducible with yellow component light, thereby improving color reproducibility of images.

It should be noted that the white point is a point on which light of respective colors is combined when a white color is reproduced.

Figure 7B:
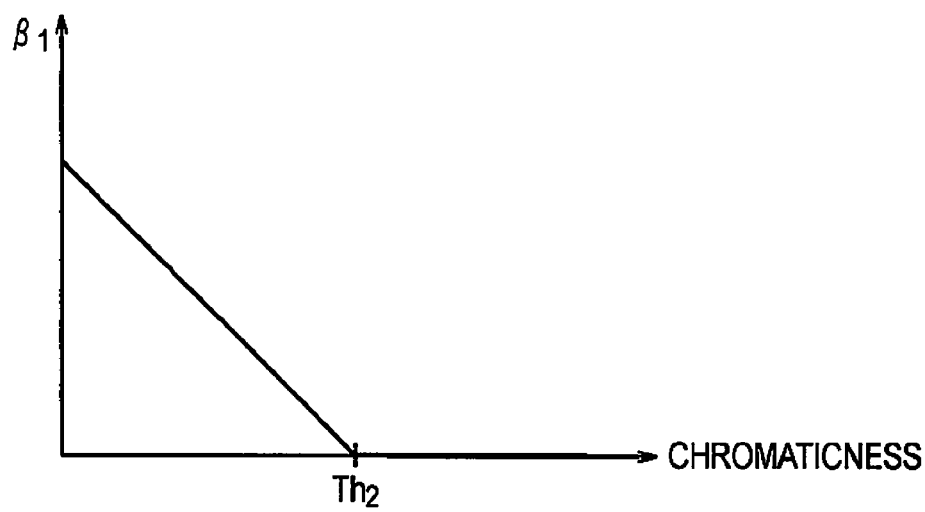

As shown in FIG. 7B, the luminance parameter $β_1$ is set so as to decrease with increase of the chromatins of the image until the chromatins of an image (a blue color, in particular) attains $Th_2$. Meanwhile, the luminance parameter $β_1$ becomes constant after the chromaticness of the image exceeds $Th_2$. That is, the luminance parameter $β_1$ is set so that when a distance between the chromatins of an image and a white point is within a certain amount, the further the chromatins of the image moves away from the white point, the more the light amount of yellow component light decreases.

Figure 7C:
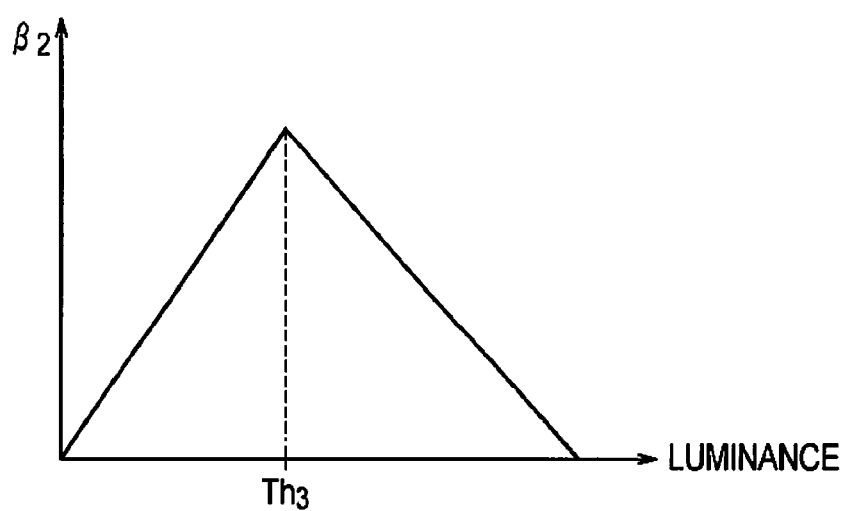

As shown in FIG. 7C, the luminance parameter $β_2$ is set so to increase increases until the luminance of an image attains $Th_3$, and to decrease after the luminance of the image exceeds $Th_3$. That is, the luminance parameter $β_2$ is set so that an amount of yellow component light decreases with the luminance of the image at $Th_3$ as its peak. This prevents "black fading effect" caused when the luminance of an image is low, and also prevents "white out effect" caused when the luminance of an image is high.

Based on the red input signal Rin, the green input signal Gin, and the Ye substitution signal W, the Ye component controlling unit 134 calculates a red adjustment signal R', a green adjustment signal G', and a yellow adjustment signal Ye'. Here, in this embodiment, when calculating the red adjustment signal R', the green adjustment signal G', and the yellow adjustment signal Ye', the Ye component controlling unit 134 uses the color reproduction parameter a and the luminance parameter $β_1$.

To be more specific, when the range of color reproducibility is to be enhanced, the Ye component controlling unit 134 calculates the red adjustment signal R', the green adjustment signal G', and the yellow adjustment signal Ye' using the color reproduction parameter a as shown in (Equation 2) to (Equation 4) below.

[Formulae 2]

$$R' = R_{in} - W \times α \quad \text{(Equation 2)}$$

$$G' = G_{in} - W \times α \quad \text{(Equation 3)}$$

$$Ye' = W \times α \quad \text{(Equation 4)}$$

Meanwhile, when luminance is to be improved, the Ye component controlling unit 134 calculates the red adjustment signal R', the green adjustment signal G', and the yellow adjustment signal Ye' using the luminance parameter $β1$ as shown in (Equation 5) to (Equation 7) below.

[Formulae 3]

$$R' = R_{in} \quad \text{(Equation 5)}$$

$$G' = G_{in} \quad \text{(Equation 6)}$$

$$Ye = W \times β_1 \quad \text{(Equation 7)}$$

The output unit 135 outputs a red output signal $R_{out}$, a green output signal $G_{out}$, and a blue output signal $B_{out}$ to a corresponding one of the DMDs (DMDs 80R, 80G, and 80B). More specifically, the output unit 135 outputs the red adjustment signal R' to the DMD 80R as the red output signal $R_{out}$, and outputs the green adjustment signal G' to the DMD 80G as the green output signal $G_{out}$. The output unit 135 outputs the blue input signal Bin as it is to the DMD 80B as the blue output signal $B_{out}$.

The output unit 135 outputs a yellow output signal $Ye_{out}$ to the light modulating optical device 90G. To be more specific, the output unit 135 outputs the yellow adjustment signal Ye' to the light modulating optical device 90G as the yellow output signal $Ye_{out}$.

In this manner, the controlling unit 130 controls amounts of modulation of the DMDs 80R, 80G, and 80B (i.e., the red output signal $R_{out}$, the green output signal $G_{out}$, and the blue output signal $B_{out}$) in response to the red input signal Rin, the green input signal Gin, and the blue input signal Bin, respectively. In addition, the controlling unit 130 controls an application voltage (i.e., the yellow output signal $Ye_{out}$) to be applied to the light modulating optical device 90G in response to the red input signal Rin, the green input signal Gin, and the blue input signal Bin.

Incidentally, when calculating the red adjustment signal R', the green adjustment signal G', and the yellow adjustment signal Ye', the controlling unit 130 may use the luminance parameter $β2$ instead of the luminance parameter $β1$.

(Operation and Advantages)

In the first embodiment, the light modulating optical device 90G transmits the light (green component light) having the first waveband, and changes the transmittance of the light (yellow component light) having the second waveband depending on the change of a molecular state. The light transmitted through the light modulating optical device 90G enters the DMD 80G.

Accordingly, it becomes possible to electrically switch the waveband of the light entering the DMD 80G while considering the improvement of luminance and color purity, without the need of a mechanical configuration.

In other words, it is possible to electrically switch between a luminance priority mode and a color purity priority mode. The luminance priority mode is suitable for a data display use, and the color purity priority mode is suitable for a home theater use.

In this embodiment, an application voltage (i.e., the yellow output signal $Ye_{out}$) to be applied to the light modulating optical device 90G is controlled in response to the red input signal Rin, the green input signal Gin, and the blue input signal Bin. Accordingly, if yellow component light is used in the luminance priority mode, the deterioration of a color balance is capable of being restrained.

Second Embodiment

A second embodiment of the present invention is described below with reference to the drawings. In the following description, differences between the first embodiment and the second embodiment are chiefly described.

To be more specific, in the first embodiment, a light modulating optical device (the light modulating optical device 90G) having a function for controlling the color purity of green component light is provided. In contrast, in the second embodiment, multiple light modulating optical devices controlling color purities of red, green, and blue component light are provided.

(Projection Display Apparatus)

Figure 8:
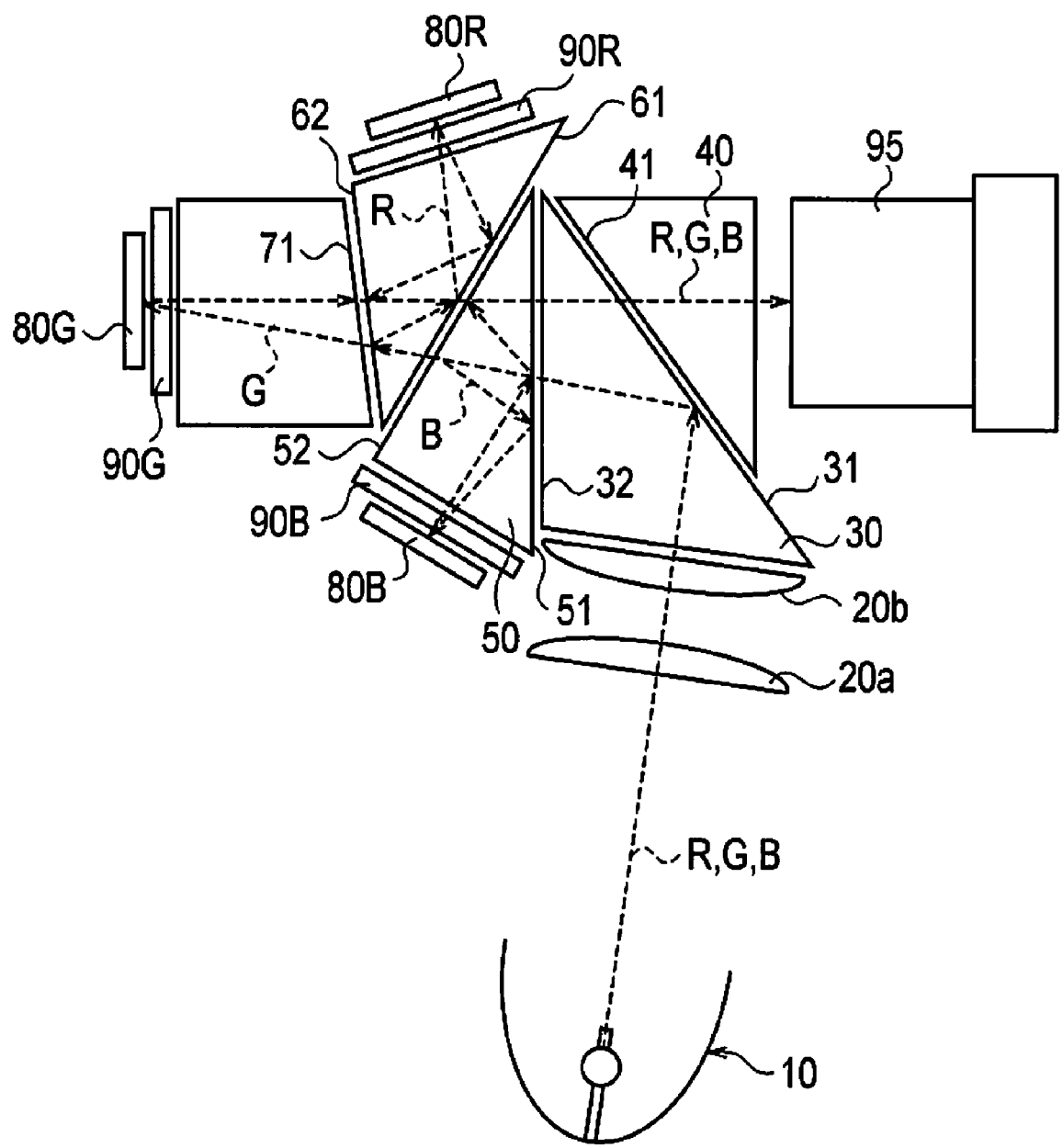
FIG. 8 is a schematic view showing a projection display apparatus 100 of a second embodiment.

A projection display apparatus of the second embodiment is described below with reference to the drawings. FIG. 8 is a schematic view showing a projection display apparatus 100 of the second embodiment of the present invention. It should be noted that in FIG. 8, those parts which are the same as those shown in FIG. 1 are given the same reference numerals.

As shown in FIG. 8, the projection display apparatus 100 includes light modulating optical devices 90R and 90B in addition to the configuration shown in FIG. 2. That is, the projection display apparatus 100 is provided with the light modulating optical devices 90R, 90G, and 90B.

The light modulating optical devices 90R, 90G, and 90B each have the same configuration as that of the light modulating optical device shown in FIG. 3.

Incidentally, in the second embodiment, a cutoff wavelength of the surface 52 of the prism 50 is provided in a waveband corresponding to a cyan color. A cutoff wavelength of the surface 62 of the prism 60 is provided in a waveband corresponding to a yellow color.

That is, red component light includes part (the long wavelength side) of the waveband corresponding to a yellow color, in addition to a waveband corresponding to a red color. Green component light includes part (the short wavelength side) of the waveband corresponding to a yellow color and part (the long wavelength side) of the waveband corresponding to a cyan color, in addition to a waveband corresponding to a green color. Blue component light includes part (the short wavelength side) of the waveband corresponding to a cyan color in addition to a waveband corresponding to a blue color.

The light modulating optical device 90R transmits light having the first waveband among incident light (red component light) regardless of a change of a molecular state. The light modulating optical device 90R changes the transmittance of light having the second waveband among incident light (red component light) depending on a change of a molecular state. The first waveband is a waveband corresponding to a red color, and the second waveband is part of a waveband corresponding to a yellow color.

The light modulating optical device 90G transmits light having the first waveband among incident light (green component light) regardless of a change of a molecular state. The light modulating optical device 90G changes the transmittance of light having the second waveband among incident light (green component light) depending on a change of a molecular state. The first waveband is a waveband corresponding to a green color, and the second waveband is part (the short wavelength side) of a waveband corresponding to a yellow color and is part (the long wavelength side) of a waveband corresponding to a cyan color.

The light modulating optical device 90B transmits light having the first waveband among incident light (blue component light) regardless of a change of a molecular state. The light modulating optical device 90B changes the transmittance of light having the second waveband among incident light (blue component light) depending on a change of a molecular state. The first waveband is a waveband corresponding to a blue color, and the second waveband is part (the short wavelength side) of a waveband corresponding to a cyan color.

Figure 9:
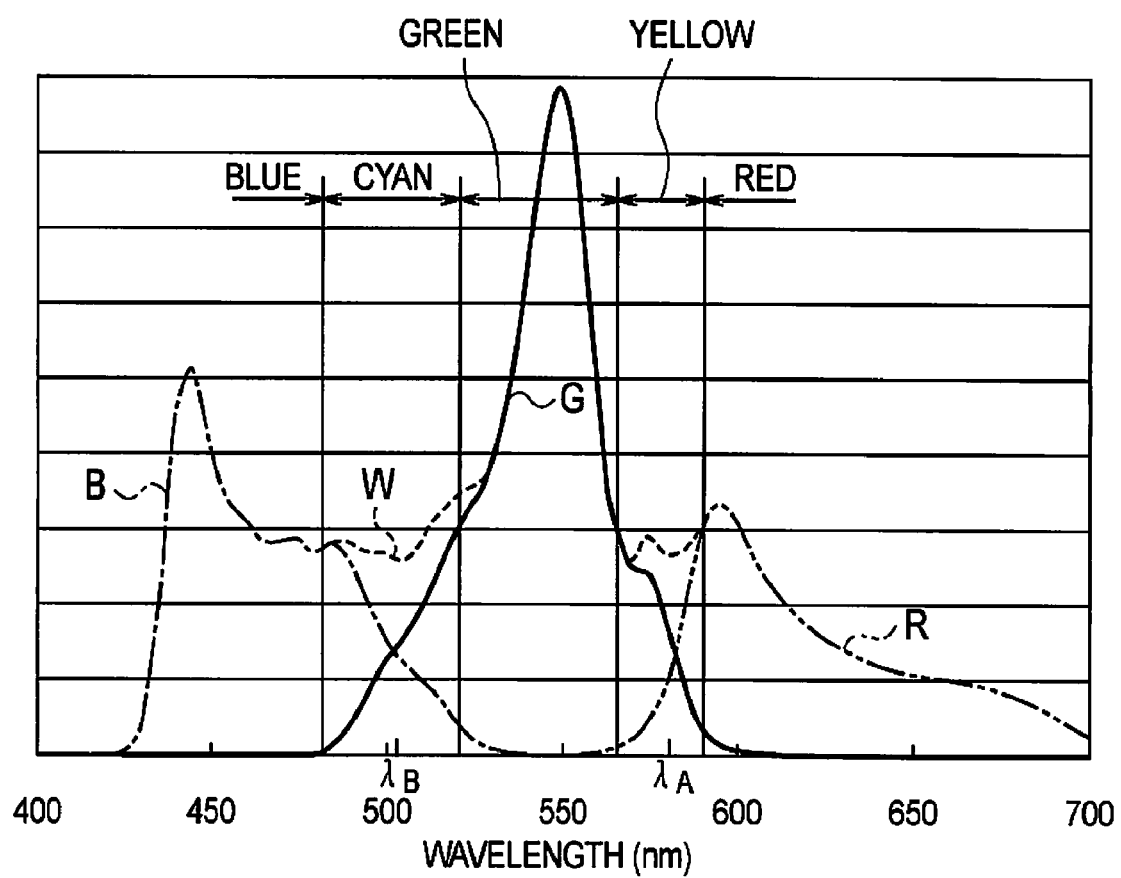
FIG. 9 is a view for describing operation of the light modulating optical device of the second embodiment.

For example, as shown in FIG. 9, a cutoff wavelength of the surface 52 of the prism 50 is provided on a wavelength $\lambda_A$ of a waveband corresponding to a yellow color. A cutoff wavelength of the surface 62 of the prism 60 is provided on a wavelength $\lambda_B$ of a waveband corresponding to a cyan color.

Red component light having a waveband longer than the wavelength $\lambda_A$ enters the light modulating optical device 90R. The light modulating optical device 90R has a function of controlling the color purity and amount of red component light by controlling a waveband of the red component light entering the DMD 80R. Further, it should be noted that it is difficult for the surface 62 of the prism 60 to perform a complete color separation, so that light having a waveband shorter than the wavelength $\lambda_A$ is included in the red component light.

Green component light having a waveband between the wavelength $\lambda_B$ and the wavelength $\lambda_A$ enters the light modulating optical device 90G. The light modulating optical device 90G has a function of controlling the color purity and amount of green component light by controlling a waveband of the green component light entering the DMD 80G. Further, it should be noted that it is difficult for the surface 62 of the prism 60 to perform a complete color separation, so that light having a waveband longer than the wavelength $\lambda_A$ is included in the green component light. Also, it should be noted that it is difficult for the surface 52 of the prism 50 to perform a complete color separation, so that light having a waveband shorter than the wavelength $\lambda_B$ is included in the green component light.

Blue component light having a waveband shorter than the wavelength $\lambda_B$ enters the light modulating optical device 90B. The light modulating optical device 90B has a function of controlling the color purity and amount of blue component light by controlling a waveband of the blue component light entering the DMD 80B. Further, it should be noted that it is difficult for the surface 52 of the prism 50 to perform a complete color separation, so that light having a waveband longer than the wavelength $\lambda_B$ is included in the blue component light.

(Operation and Advantages)

In the second embodiment, the light modulating optical devices 90R, 90G, and 90B control the purities and amounts of red component light, green component light, and blue component light, depending on the application voltages to be applied to the light modulating optical devices 90R, 90G, and 90B, respectively.

Accordingly, it becomes possible to electrically switch the wavebands of the light entering the DMDs 80R, 80G, and 80B while considering the improvement of luminance and color purity, without the need of a mechanical configuration.

In other words, it is possible to electrically switch between a luminance priority mode and a color purity priority mode. The luminance priority mode is suitable, for example, for a data display use, and the color purity priority mode is suitable, for example, for a home theater use.

Third Embodiment

A third embodiment of the present invention is described below with reference to the drawing. In the following description, differences between the first embodiment and the third embodiment are chiefly described.

The example shown in the first embodiment is the projection display apparatus 100 corresponding to DLP system (registered trademark). In contrast, an example shown in the third embodiment is a three-panel projection display apparatus provided with liquid crystal panels.

(Projection Display Apparatus)

Figure 10:
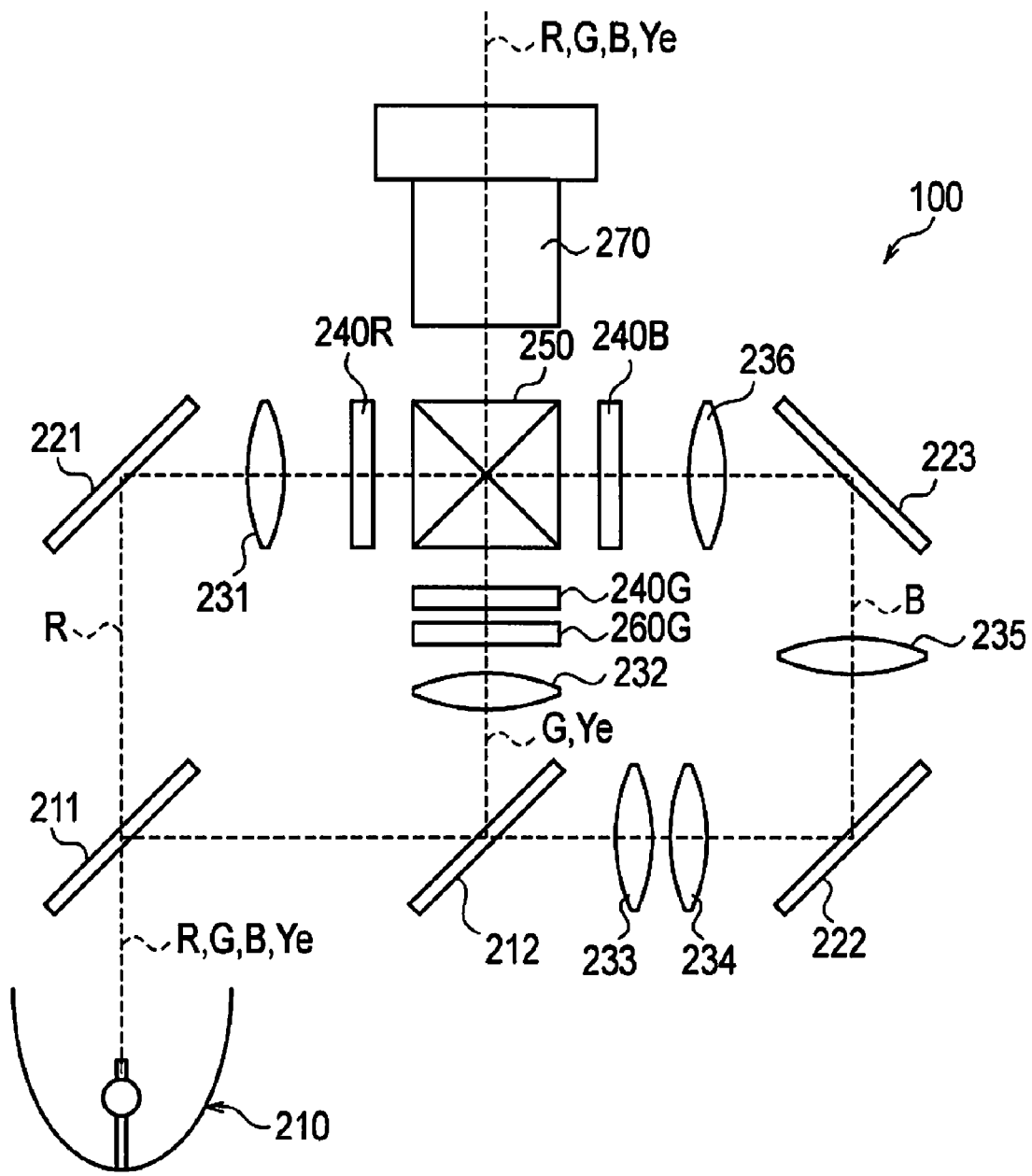
FIG. 10 is a schematic view showing a projection display apparatus 100 of a third embodiment.

A projection display apparatus of the third embodiment is described below with reference to the drawing. FIG. 10 is a schematic view of a projection display apparatus 100 of the third embodiment. An example shown in the third embodiment is the projection display apparatus 100 provided with liquid crystal panels.

It should be noted that components such as the following are omitted in FIG. 10. Omitted components include a fly eye lens homogenizing light emitted from a light source 210, and a PBS (Polarized Beam Splitter) aligning the polarizing direction of light emitted from the light source into one direction.

As shown in FIG. 10, the projection display apparatus 100 includes the light source 210, a mirror group (mirrors 211, 212, and 221 to 223), a lens group (lenses 231 to 236), multiple liquid crystal panels (liquid crystal panels 240R, 240G, and 240B), a color combining unit 250, a light modulating optical device 260G, and a projection lens unit 270.

As with the light source 10, the light source 210 is a UHP lamp emitting white light, or the like. That is, light emitted from the light source 210 includes red component light, green component light, and blue component light.

The mirror 211 is a dichroic surface which transmits red component light and reflects green component light, blue component light, and yellow component light. The mirror 212 is a dichroic surface which transmits blue component light and reflects green component light and yellow component light. That is, the mirrors 211 and 212 function as color separators separating light of respective colors.

Here, a cutoff wavelength of the mirror 211 is provided between a waveband corresponding to a red color (red component light) and a waveband corresponding to a green color (green component light). To be more precise, a cutoff wavelength of the mirror 211 is provided between a waveband corresponding to a red color (red component light) and a waveband corresponding to a yellow color (yellow component light). A cutoff wavelength of the mirror 212 is provided between a waveband corresponding to a green color (green component light) and a waveband corresponding to a blue color (blue component light).

The mirror 221 is a reflection mirror which reflects red component light to lead it to the side of the liquid crystal panel 240R. The mirrors 222 and 223 are reflection mirrors which reflect blue component light to lead it to the side of the liquid crystal panel 240B.

The lens 231 is a condenser lens which substantially parallelizes red component light so that the liquid crystal panel 240R is illuminated with the red component light. The lens 232 is a condenser lens which substantially parallelizes green component light and yellow component light so that the liquid crystal panel 240G is illuminate with the green component light and the yellow component light. The lens 233 is a condenser lens which substantially parallelizes blue component light so that the liquid crystal panel 240B is illuminated with the blue component light.

The lenses 234 to 236 are relay lenses which cause blue component light to substantially form an image on the liquid crystal panel 240B while suppressing enhancement of the blue component light.

The liquid crystal panel 240R modulates red component light by rotating the polarizing direction of the red component light. The liquid crystal panel 240G modulates green component light including yellow component light by rotating the polarizing direction of the green component light including the yellow component light. The liquid crystal panel 240B modulates blue component light by rotating the polarizing direction of the blue component light.

The color combining unit 250 is a dichroic prism which combines light emitted from the liquid crystal panels 240R, 240G, and 240B. To be more specific, the color combining unit 250 combines red component light emitted from the liquid crystal panel 240R, green component light (including yellow component light) emitted from the liquid crystal panel 240G, and blue component light emitted from the liquid crystal panel 240B. The color combining unit 250 emits, to the projection lens unit 270, combined light (imaging light) of the red component light, the green component light, the blue component light, and the yellow component light.

The light modulating optical device 260G has the same configuration as that of the light modulating optical device shown in FIG. 3. To be more specific, the light modulating optical device 260G transmits light having the first waveband among incident light (green component light) regardless of a change of a molecular state. The light modulating optical device 260G changes the transmittance of light having the second waveband among incident light (green component light) depending on a change of a molecular state. The first waveband is a waveband corresponding to a green color (green component light), and the second waveband is a waveband corresponding to a yellow color (yellow component light). The light modulating optical device 260G is provided on the light incidence side of the liquid crystal panel 240G.

That is, the light modulating optical device 260G has a function of controlling the color purity and amount of incidence light by controlling a waveband of the incidence light (green component light and yellow component light) entering the liquid crystal panel 240G.

The projection lens unit 270 projects the combined light (imaging light) emitted from the color combining unit 250 on a screen (not shown).

(Operation and Advantages)

The three-panel projection display apparatus of the third embodiment provided with liquid crystal panels has the same advantages as those attained by the first embodiment.

Fourth Embodiment

A fourth embodiment of the present invention is described below with reference to the drawing. In the following description, differences between the third embodiment and the fourth embodiment are chiefly described.

To be more specific, in the third embodiment, a light modulating optical device (the light modulating optical device 260G) having a function of controlling the color purity of green component light is provided. In contrast, in the fourth embodiment, multiple light modulating optical devices controlling the color purities of red component light, green component light, and blue component light are provided.

(Projection Display Apparatus)

Figure 11:
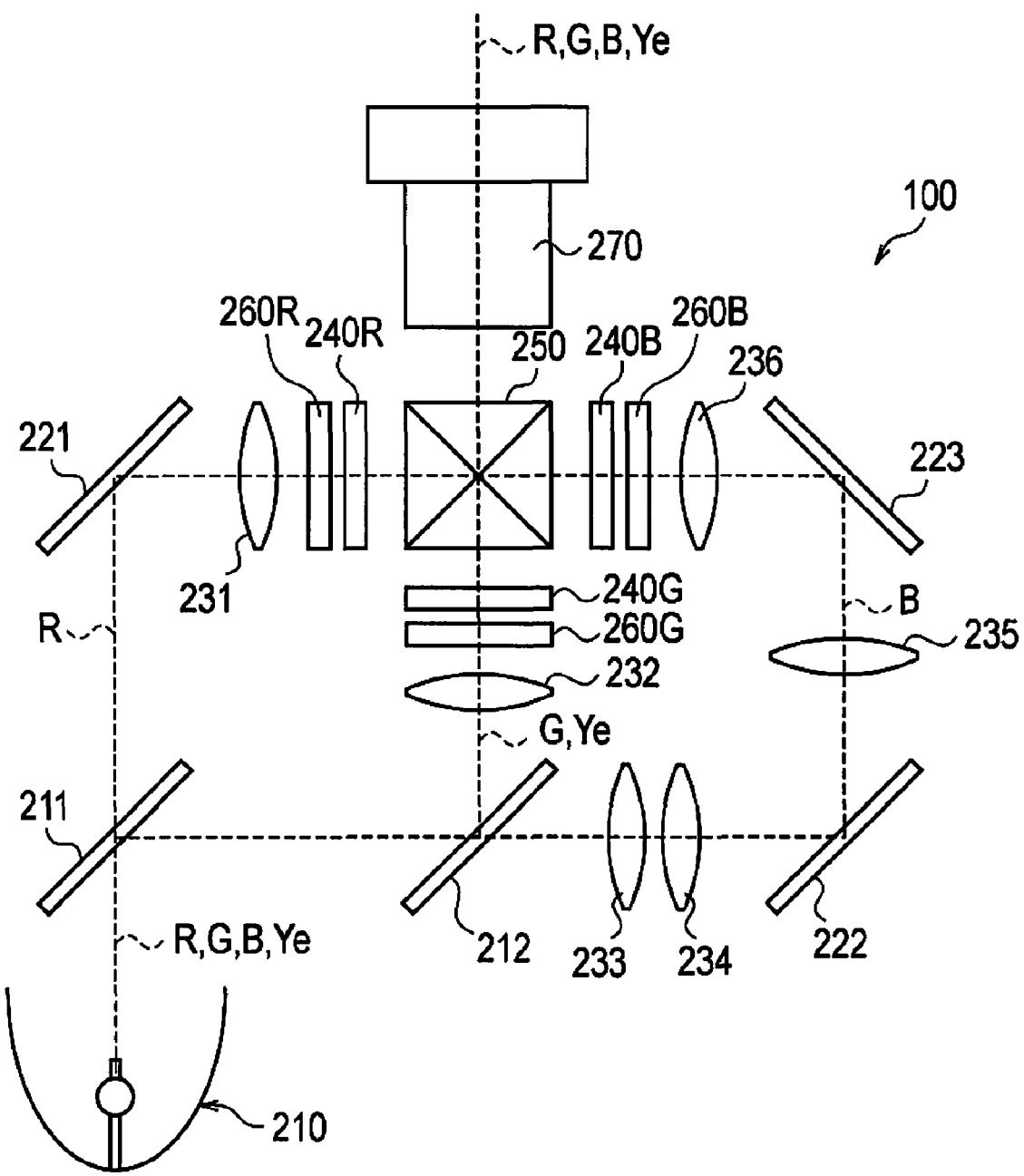
FIG. 11 is a schematic view showing a projection display apparatus 100 of a fourth embodiment.

A projection display apparatus of the fourth embodiment is described below with reference to the drawing. FIG. 11 is a schematic view showing a projection display apparatus 100 of the fourth embodiment of the present invention. It should be noted that in FIG. 11, parts identical to those shown in FIG. 10 are given the identical reference numerals.

As shown in FIG. 11, the projection display apparatus 100 includes light modulating optical devices 260R and 260B in addition to the configuration shown in FIG. 10. That is, the projection display apparatus 100 is provided with the light modulating optical devices 260R, 260G, and 260B.

The light modulating optical devices 260R, 260G, and 260B each have the same configuration as that of the light modulating optical device shown in FIG. 3.

Incidentally, in the fourth embodiment, a cutoff wavelength of the mirror 211 is provided in a waveband corresponding to a cyan color. A cutoff wavelength of the mirror 212 is provided in a waveband corresponding to a yellow color.

The light modulating optical device 260R transmits light having the first waveband among incident light (red component light) regardless of a change of a molecular state. The light modulating optical device 260R changes the transmittance of light having the second waveband among incident light (red component light) depending on a change of a molecular state. The first waveband is a waveband corresponding to a red color, and the second waveband is part (the long wavelength side) of a waveband corresponding to a yellow color. The light modulating optical device 260R is provided on the light incident side of the liquid crystal panel 240R.

The light modulating optical device 260G transmits light having the first waveband among incident light (green component light) regardless of a change of a molecular state. The light modulating optical device 260G changes the transmittance of light having the second waveband among incident light (green component light) depending on a change of a molecular state. The first waveband is a waveband corresponding to a green color, and the second waveband is part (the short wavelength side) of a waveband corresponding to a yellow color and is part (the long wavelength side) of a waveband corresponding to a cyan color. The light modulating optical device 260G is provided on the light incident side of the liquid crystal panel 240G.

The light modulating optical device 260B transmits light having the first waveband among incident light (blue component light) regardless of a change of a molecular state. The light modulating optical device 260G changes the transmittance of light having the second waveband among incident light (blue component light) depending on a change of a molecular state. The first waveband is a waveband corresponding to a blue color, and the second waveband is part (the short wavelength side) of a waveband corresponding to a cyan color. The light modulating optical device 260B is provided on the light incident side of the liquid crystal panel 240B.

(Operation and Advantages)

The three-panel projection display apparatus of the fourth embodiment provided with liquid crystal panels has the same advantages as those attained by the second embodiment.

Fifth Embodiment

A fifth embodiment of the present invention is described below with reference to the drawings. In the following description, differences between the third embodiment and the fifth embodiment are chiefly described.

To be more specific, in the third embodiment, provided is a light modulating optical device (the light modulating optical device 260G) having a function of controlling the color purity of green component light. In contrast, in the fifth embodiment, a light modulating optical device is used as a color separator separating light of respective colors.

(Projection Display Apparatus)

Figure 12:
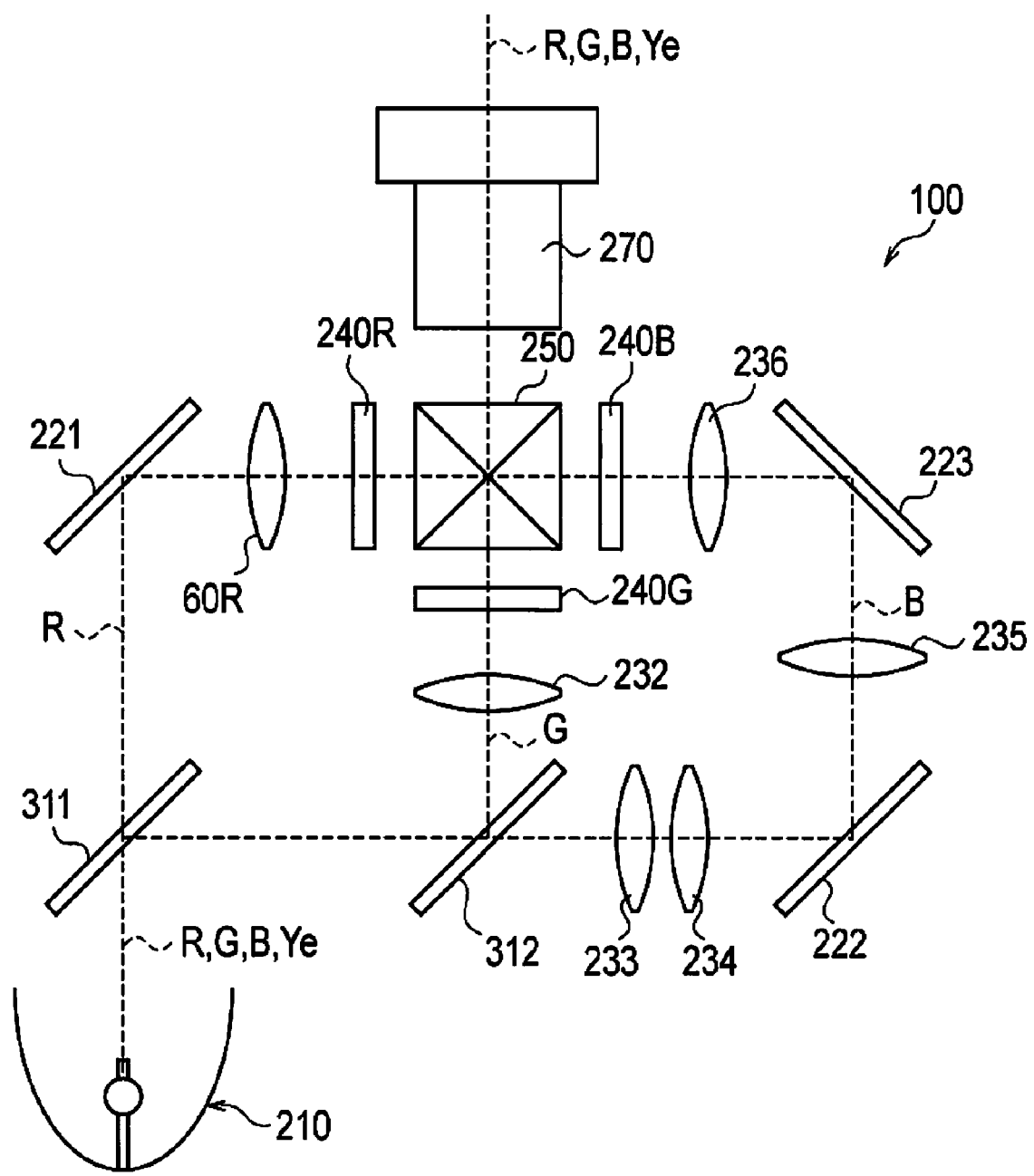
FIG. 12 is a schematic view showing a projection display apparatus 100 of a fifth embodiment.

A projection display apparatus of the fifth embodiment is described below with reference to the drawings. FIG. 12 is a schematic view showing a projection display apparatus 100 of the fifth embodiment of the present invention. It should be noted that in FIG. 12, those parts which are the same as those shown in FIG. 10 are given the same reference numerals.

As shown in FIG. 12, the projection display apparatus 100 includes a mirror 312 and a light modulating optical device 312 instead of the mirrors 211 and 212 of FIG. 10. However, it should be noted that in the fifth embodiment, the light modulating optical device 260G is not provided. Further, it should be noted that in the fifth embodiment, a light path of blue component light and a light path of red component light are interchanged, compared to the third embodiment.

As shown in FIG. 12, the mirror 311 is a dichroic mirror which transmits blue component light and reflects red component light, green component light, and yellow component light. A cutoff wavelength of the mirror 311 is provided between a waveband corresponding to a green color (green component light) and a waveband corresponding to a blue color (blue component light).

Incident light including red component light, green component light, and blue component light enters the light modulating optical device 312. To be more specific, the light modulating optical device 312 transmits light (red component light) including the first waveband, and reflects light (green component light) including a third waveband.

The light modulating optical device 312 selectively transmits or reflects light (yellow component light) having a second waveband. To be more specific, the light modulating optical device 312 changes the transmittance of the light (yellow component light) having the second waveband depending on a change of a molecular state. It should be noted that the transmittance may be considered to be given by "1—Reflectance." In addition, the second waveband is one between the first waveband and the third waveband.

(Light Modulating Optical Device)

Function of a light modulating optical device (the light modulating optical device 312) of the fifth embodiment is described with reference to FIGS. 13A and 13B.

Figure 13A:
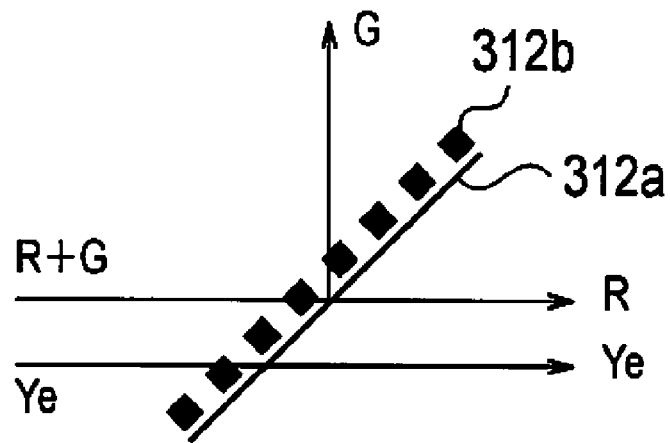
FIGS. 13A and 13B are views for describing function of the light modulating optical device of the fifth embodiment.
Figure 13B:
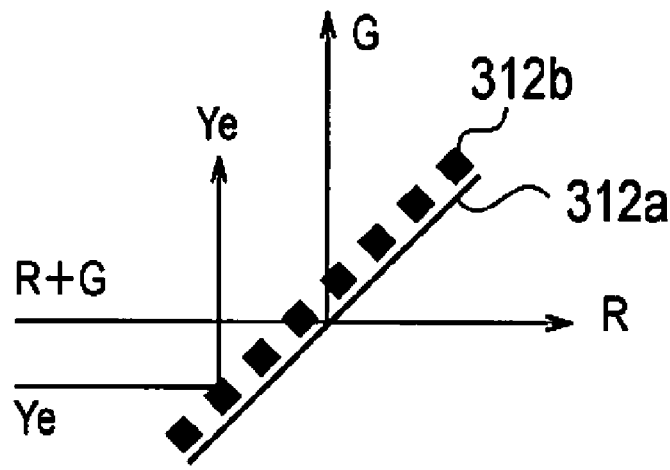

As shown in FIGS. 13A and 13B, the light modulating optical device 312 is formed of a dielectric multilayer film 312a and cholesteric liquid crystals 312b.

The dielectric multilayer film 312a is a dichroic film which transmits red component light and reflects green component light. The dielectric multilayer film 312a is provided on the light emitting side of the cholesteric liquid crystals 312b. A cutoff wavelength of the dielectric multilayer film 312a is provided between a waveband corresponding to a red color (red component light) and a waveband corresponding to a green color (green component light). To be more precise, a cutoff wavelength of the dielectric multilayer film 312a is provided between a waveband corresponding to a green color (green component light) and a waveband corresponding to a yellow color (yellow component light).

As shown in FIGS. 13A and 13B, the cholesteric liquid crystals 312b are devices in which a molecular state (here, an arrangement of molecules) is changed according to an application voltage to be applied to the cholesteric liquid crystals 312b. The cholesteric liquid crystals 312b work only on light having the second waveband, among incident light.

Figure 14:
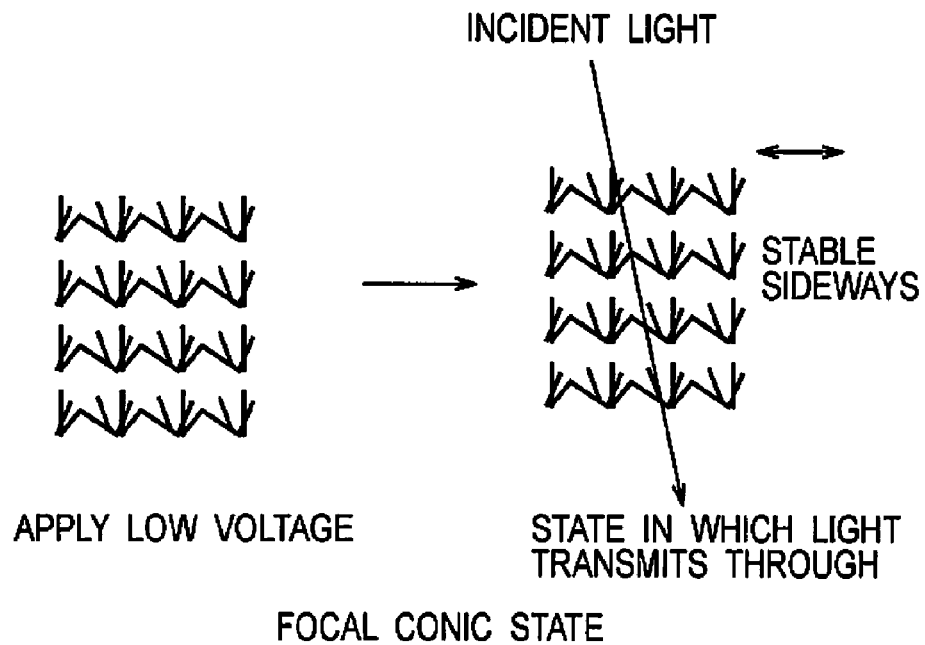
FIG. 14 is a view for describing functions of the light modulating optical device of the fifth embodiment.
Figure 14:
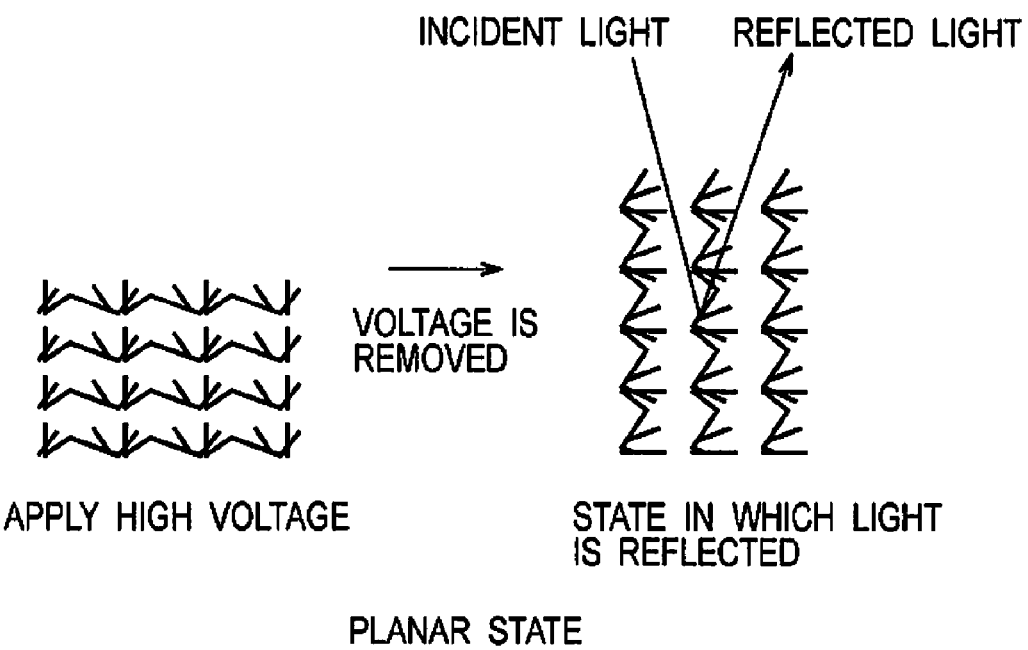

To be more specific, as shown in FIG. 14A, when being applied with a low voltage, the cholesteric liquid crystals 312b become stable at a molecular state (focal conic state) in which the crystals 312 transmit light having the second waveband.

Meanwhile, as shown in FIG. 14B, when being applied with a high voltage, the cholesteric liquid crystals 312b become stable at a molecular state (planar state) in which the crystals 312 transmit light having the second waveband.

In this manner, the cholesteric liquid crystals 312b are applied with a low voltage or a high voltage, thereby selectively switching between the transmission and reflection of light having the second waveband.

As shown in FIG. 13A, when the cholesteric liquid crystals 312b are in the focal conic state, the light modulating optical device 312 transmit red component light and yellow component light, and reflects green component light with the dielectric multilayer film 312a. That is, in a state (focal conic state) in which the cholesteric liquid crystals 312b transmit yellow component light, the cholesteric liquid crystals 312b transmit yellow component light along with red component light.

In the meantime, as shown in FIG. 13B, when the cholesteric liquid crystals 312b are in the planar state, the light modulating optical device 312 transmit red component light, reflects yellow component light with the cholesteric liquid crystals 312b, and reflects green component light with the dielectric multilayer film 312a. That is, in a state (planar state) in which the cholesteric liquid crystals 312b do not transmit yellow component light, the light modulating optical device 312 reflects yellow component light along with green component light.

Figure 15:
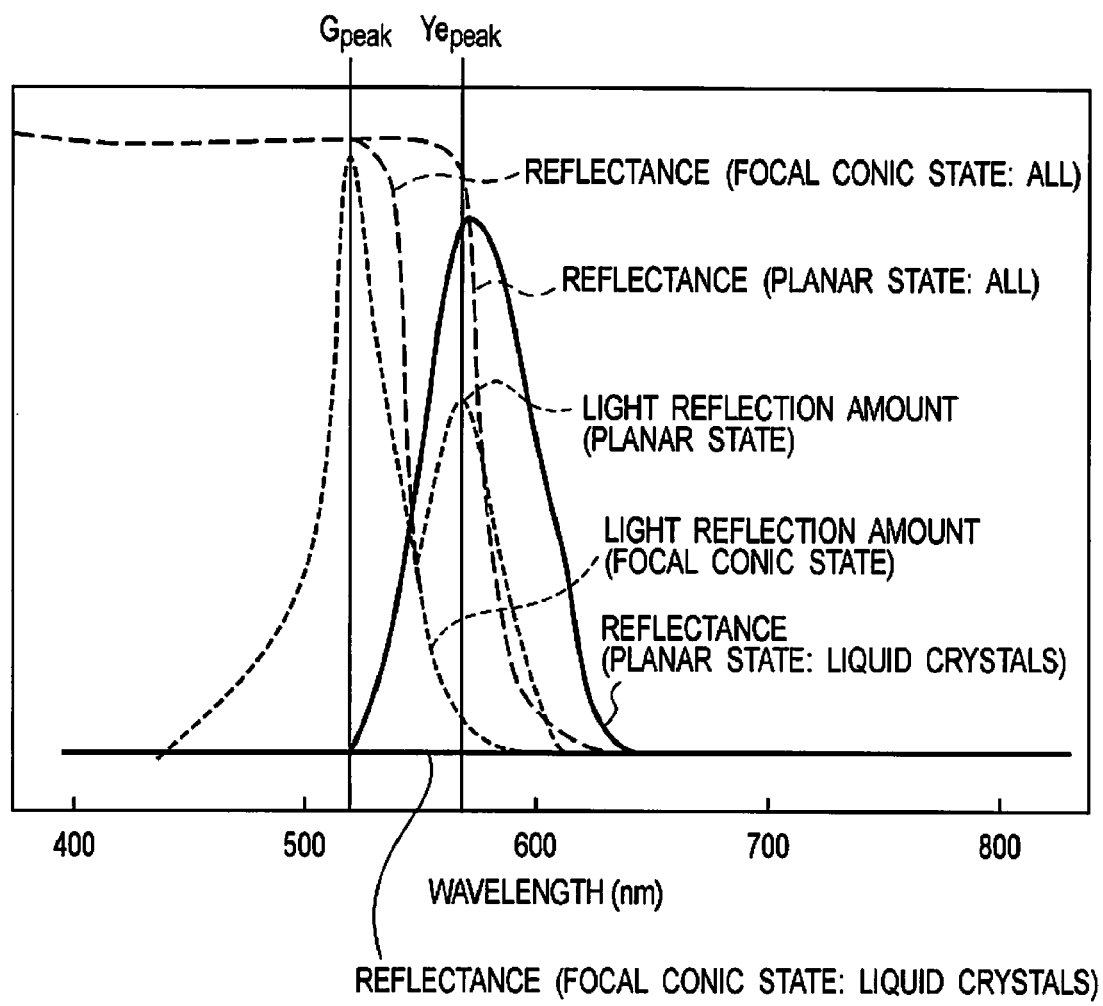
FIG. 15 is a view for describing operation of the light modulating optical device of the fifth embodiment.

Second, operation of the light modulating optical device 312 of the fifth embodiment is described with reference to FIG. 15. In FIG. 15, shown are reflectance (focal conic state: liquid crystals/planar sate: liquid crystals) of light entering the cholesteric liquid crystals 312b; reflectance (focal conic state: all/planar sate: all) of light entering the light modulating optical device 312; and reflection amount (focal conic state/planar sate) of light entering the light modulating optical device 312.

As shown in FIG. 15, in the focal conic state, the reflectance of the cholesteric liquid crystals 312b remains at low level. Meanwhile, the dielectric multilayer film 312a reflects green component light having a peak value on a wavelength ($G_{peak}$) corresponding to a green color.

As a result, the reflectance of the light modulating optical device 312 monotonically decreases after passing the wavelength ($G_{peak}$). Accordingly, the light reflection amount of the light modulating optical device 312 has a peak value on the wavelength ($G_{peak}$) corresponding to a green color, and monotonically decreases on the side of a longer wavelength than the wavelength ($G_{peak}$). That is, the light reflection amount of the light modulating optical device 312 does not have a peak value on a wavelength ($Ye_{peak}$) corresponding to a yellow color.

Meanwhile, in the planar state, the reflectance of the cholesteric liquid crystals 312b monotonically increases on the side of a longer wavelength than 500 nm and attains its peak on the wavelength ($Ye_{peak}$) corresponding to a yellow color, and monotonically decreases thereafter. The dielectric multilayer film 312a reflects green component light having a peak value on the wavelength ($G_{peak}$) corresponding to a green color.

As a result, the reflectance of the light modulating optical device 312 has a peak value on the wavelength ($G_{peak}$) corresponding to a green color and also has a peak value on the wavelength ($Ye_{peak}$) corresponding to a yellow color. Accordingly, the light reflection amount of the light modulating optical device 312 has a peak value on the wavelength ($G_{peak}$) corresponding to a green color and also has a peak value on the wavelength ($Ye_{peak}$) corresponding to a yellow color.

As described above, in the focal conic state, the light modulating optical device 312 reflects green component light having the third waveband (a waveband corresponding to a green color), and transmits red component light having the first waveband (a waveband corresponding to a red color) and yellow component light having the second waveband (a waveband corresponding to a yellow color). Meanwhile, in the planar state, the light modulating optical device 312 reflects yellow component light having the second waveband (a waveband corresponding to a yellow color) and green component light having the third waveband (a waveband corresponding to a green color), and transmits red component light having the first waveband (a waveband corresponding to a red color).

(Operation and Advantages)

In the fifth embodiment, the light modulating optical device 312 has a function of separating red component light having the first waveband (a waveband corresponding to a red color) and green component light having the third waveband (a waveband corresponding to a green color). The light modulating optical device 312 electrically switches between a superimposition of yellow component light having the second waveband (a waveband corresponding to a yellow color) on red component light, and a superimposition of yellow component light having the second waveband (a waveband corresponding to a yellow color) on green component light.

Therefore, luminance can be improved while considering the deterioration of color purity caused by the superimposition of the yellow component light.

For example, if superimposing the yellow component light on the red component light has a large adverse effect on images due to the deterioration of the color purity of the red component light, the yellow component light is superimposed on the green component light. Inversely, if superimposing the yellow component light on the green component light has a large adverse effect on images due to the deterioration of the color purity of the green component light, the yellow component light is superimposed on the red component light.

Sixth Embodiment

A sixth embodiment of the present invention is described below with reference to the drawing. In the following description, differences between the fifth embodiment and the sixth embodiment are chiefly described.

To be more specific, in the sixth embodiment, a light modulating optical device having a function for controlling the color purity of red component light is provided in addition to the configuration of the fifth embodiment.

(Projection Display Apparatus)

Figure 16:
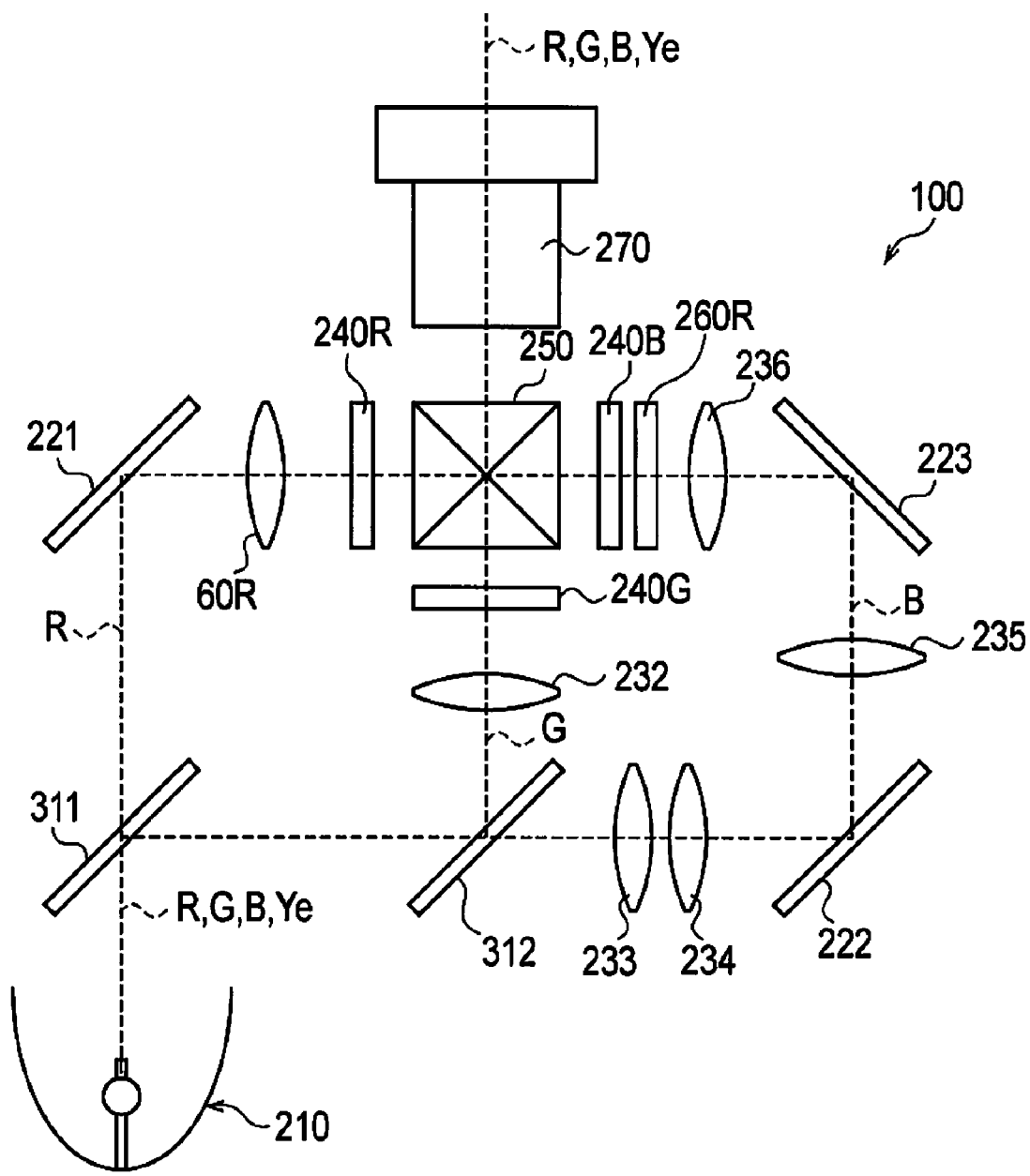
FIG. 16 is a schematic view showing a projection display apparatus 100 of a sixth embodiment.

A projection display apparatus of the sixth embodiment is described below with reference to the drawing. FIG. 16 is a schematic view showing a projection display apparatus 100 of the sixth embodiment of the present invention. In FIG. 16, those parts which are the same as those shown in FIG. 12 are given the same reference numerals.

As shown in FIG. 16, the projection display apparatus 100 is provided with a light modulating optical device 260R, in addition to the configuration shown in FIG. 12.

As in the fifth embodiment, the light modulating optical device 260R transmits light having the first waveband among incident light (red component light) regardless of a change of a molecular state. The light modulating optical device 260R changes the transmittance of light having the second waveband among incident light (red component light) depending on a change of a molecular state. The first waveband is a waveband corresponding to a red color, and the second waveband is part (the long waveband side) of a waveband corresponding to a yellow color. The light modulating optical device 260R is provided on the light incidence side of the liquid crystal panel 240R.

(Operation and Advantages)

In the sixth embodiment, the light modulating optical device 260R is provided on the light incidence side of the liquid crystal panel 240R. The light modulating optical device 260R electrically controls the color purity and amount of red component light depending on an application voltage to be applied to the light modulating optical device 260R.

Therefore, a combination of the light modulating optical device 312 and the light modulating optical device 260R enables electric switching between the luminance priority mode and the color purity priority mode.

Seventh Embodiment

A seventh embodiment of the present invention is described below. In the following description, differences between the first to sixth embodiments and the seventh embodiment are described.

To be more specific, in the first to sixth embodiments, a light modulating optical device has a structure in which a molecular state reversibly changes depending on an application voltage to be applied to the light modulating optical device. In contrast, in the seventh embodiment, a light modulating optical device has a structure in which a physical device state reversibly changes depending on an application voltage to be applied to the light modulating optical device.

In the first to sixth embodiments, the light modulating optical device transmits light having the first waveband. In contrast, in the seventh embodiment, the light modulating optical device reflects light having the first waveband.

In the first to sixth embodiment, the light modulating optical device changes the transmittance of light having the second waveband depending on the application voltage to be applied to the light modulating optical device. In contrast, in the seventh embodiment, the light modulating optical device changes reflectance of light having the second waveband depending on the application voltage to be applied to the light modulating optical device.

(Projection Display Apparatus)

Figure 17:
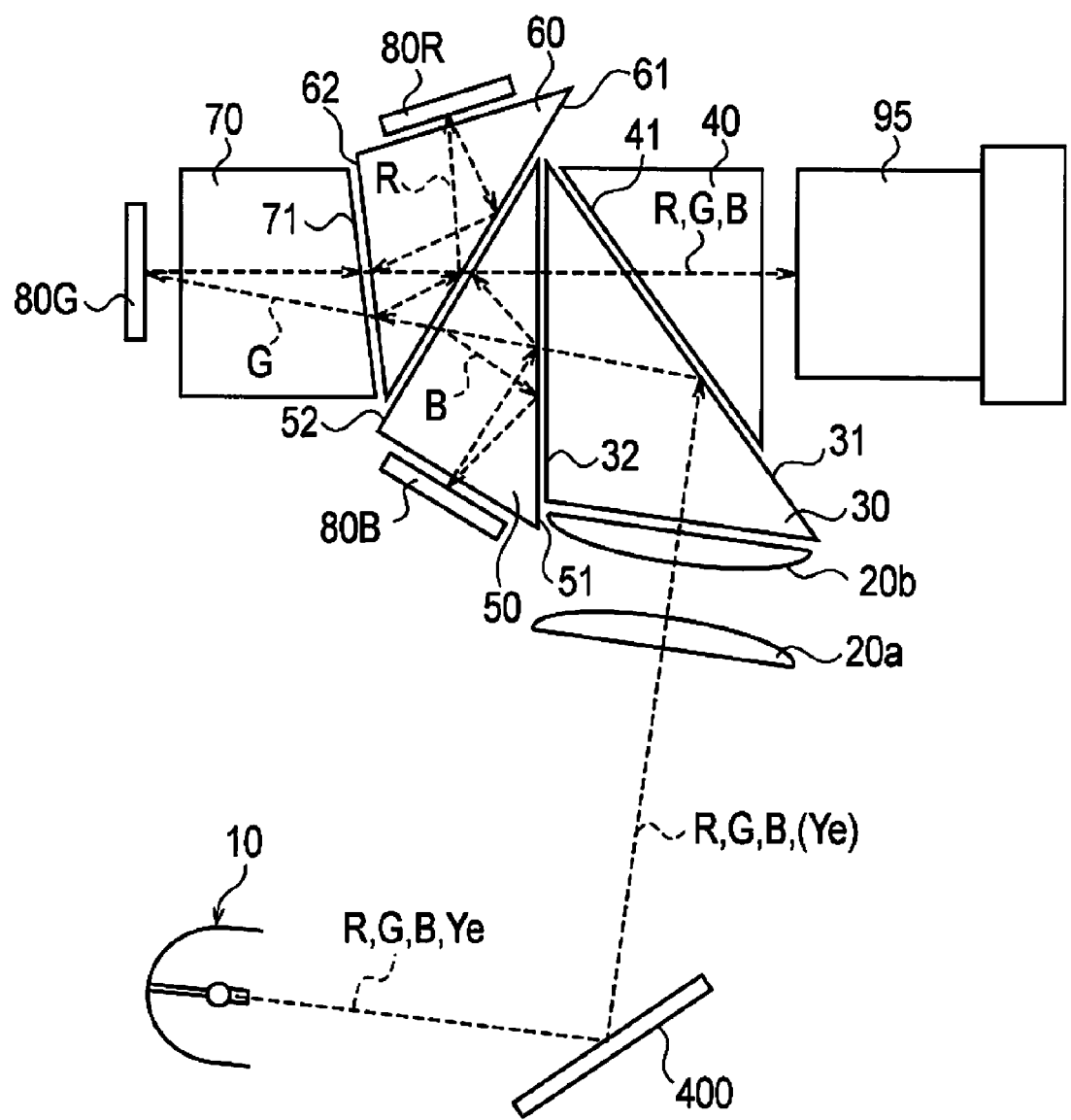
FIG. 17 is a schematic view showing a projection display apparatus 100 of a seventh embodiment.

A projection display apparatus of the seventh embodiment is described below with reference to the drawing. FIG. 17 is a schematic view showing a projection display apparatus 100 of the seventh embodiment of the present invention. In FIG. 17, those parts which are the same as those shown in FIG. 1 are given the same reference numerals.

As shown in FIG. 17, the projection display apparatus 100 is provided with a light modulating optical device 400, in place of the light modulating optical device 90G.

The light modulating optical device 400 is provided between a group of color separators (color combining group) composed of prisms 30~70 and the light source 10. The light modulating optical device 400 reflects light emitted from the light source 10 to the side of the prism 30.

Here, incident light having a first waveband and a second waveband enters the light modulating optical device 400. The light modulating optical device 400 reflects the light having the first waveband, and changes the reflectance of the light having the second waveband depending on the physical device state. It should be noted that the light modulating optical device 400 does not change the reflectance of the light having the first waveband.

For example, the light having the first waveband is the red component light, the green component light, and the blue component light. And the light having the second waveband is the fourth color component (e.g., yellow component light).

(Configuration of Light Modulating Optical Device)

Figure 18:
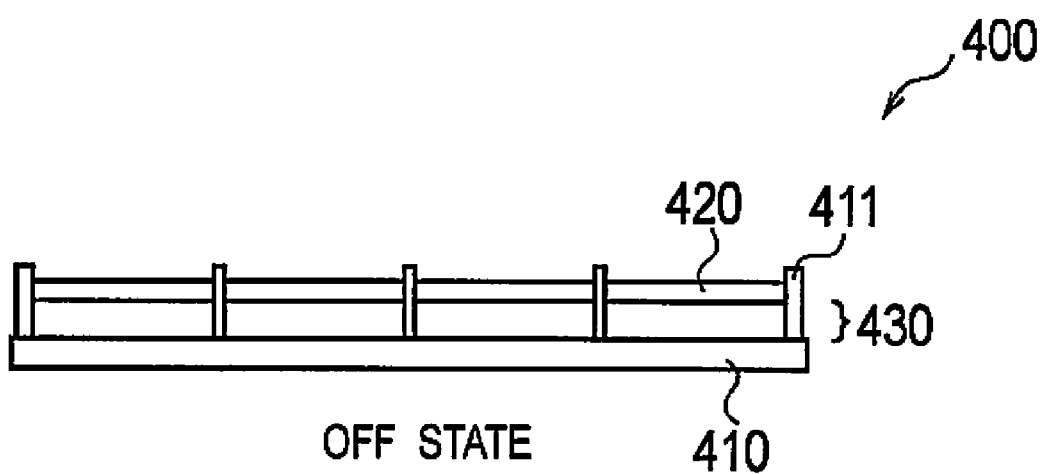
FIG. 18 is a view for describing configurations of the light modulating optical device of the seventh embodiment.

A configuration of a light modulating optical device of the seventh embodiment is described below with reference to the drawing. FIG. 18 is a schematic view showing a light modulating optical device 400 of the seventh embodiment of the present invention. FIG. 18 is a pattern diagram showing the light modulating optical device 400 from a lateral view.

As shown in FIG. 18, the light modulating optical device 400 includes a substrate 410 and a resonant grating film 420. A gap 430 is provided between the substrate 410 and the resonant grating film 420. The resonant grating film 420 is supported by a frame body 411 which is provided on the substrate 410.

The light modulating optical device 400 has a structure in which a device state (a width of the gap 430, in other words, a distance between the substrate 410 and the resonant grating film 420) reversibly changes depending on the application voltage to be applied to the light modulating optical device 400.

For example, the width of the gap 430 becomes wide when the voltage is not applied to the light modulating optical device 400. In contrast, the width of the gap 430 becomes narrow when the voltage is applied to the light modulating optical device 400.

As described above, the light modulating optical device 400 changes a diffraction state (interference state) of light according to the change in width of the gap 430. Accordingly, the light modulating optical device 400 changes the reflectance of the light having the second waveband (yellow component light).

(Function of Light Modulating Optical Device)

A function of a light modulating optical device of the seventh embodiment is described below with reference to the drawing. FIG. 19 is a schematic view showing a function a light modulating optical device 400 of the seventh embodiment of the present invention.

Figure 19A:
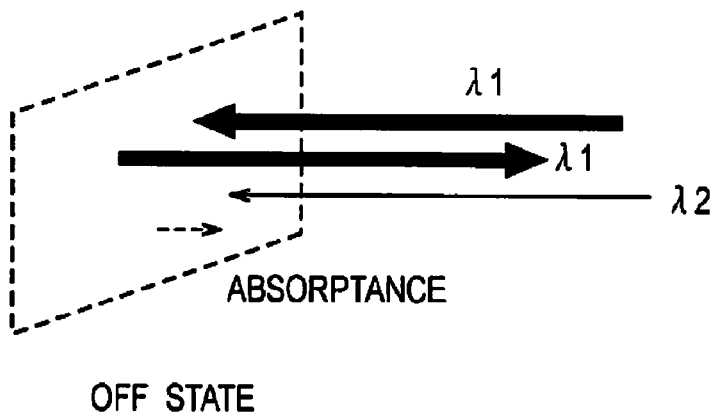
FIGS. 19A and 19B are views for describing functions of the light modulating optical device of the seventh embodiment

As shown in FIG. 19A, the light modulating optical device reflects light having a first waveband $\lambda 1$, and absorbs (reflects or diffracts) light having a second waveband $\lambda 2$ when the application voltage to be applied to the light modulating optical device is not applied (OFF state).

Figure 19B:
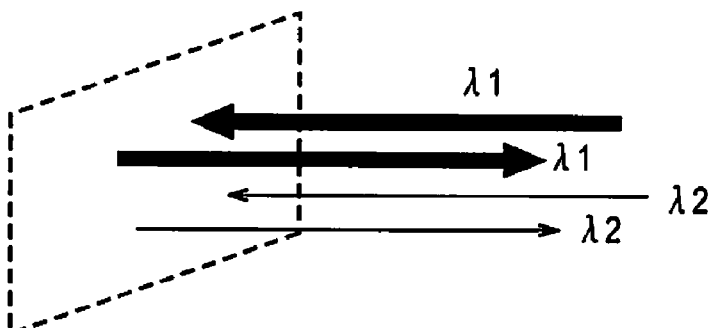

In contrast, as shown in FIG. 19B, the light modulating optical device reflects both the light having the first waveband $\lambda 1$ and the light having the second waveband $\lambda 2$ when the application voltage to be applied to the light modulating optical device is applied (ON state).

Although the light modulating optical device 400 has been described as a reflexive light modulating optical device which reflects light having the first waveband and changes the reflectance of light having the second waveband depending on physical device state, the seventh embodiment is not limited thereto. Specifically, the light modulating optical device 400 may be a transmissive light modulating optical device which transmits the light having the first waveband and changes the transmittance of the light having the second waveband depending on physical device state.

Other Embodiments

As described above, the present invention has been set forth using the embodiments. However, it should not be understood that the present invention is limited by the discussion and the drawings constituting a part of this disclosure. It is apparent to those skilled in the art that various alternatives, modifications, and the practices can be made based on this disclosure.

For example, while not particularly described in the embodiments, the light modulating optical device is an electrochromic (EC) device. For example, as the EC device, biphenyldicarboxylic diethyl (PCE), dimethyl terephthalate (DTM), diacetylbenzene (DAB), and the like are considered. PCE has a molecular structure in which the absorptance of light having a waveband corresponding to a yellow color is changed depending on an application voltage. DTM has a molecular structure in which the absorptance of light having a waveband corresponding to a magenta color is changed depending on an application voltage. DAB has a molecular structure in which the absorptance of light having a waveband corresponding to a cyan color is changed depending on an application voltage.

Although it is assumed that a light modulating optical device does not have resolution in the embodiments described above, the present invention is not limited thereto. More specifically, a light modulating optical device may have resolution. In this case, the resolution of the light modulating optical device is preferably lower than that of DMD or a liquid crystal panel in order to prevent the deterioration of transmittance by an electrode or the like. However, it should be noted that the resolution of the light modulating optical device may be equal to that of DMD or a liquid crystal panel.

What is claimed is:

1. A lighting unit comprising:
a light source configured to emit light including at least red component light, green component light, and blue component light;
a red light imager configured to modulate the red component light;
a green light imager configured to modulate the green component light;
a blue light imager configured to modulate the blue component light;
a color combining unit configured to combine light emitted from the red light imager, the green light imager, and the blue light imager; and
a light modulating optical device configured to have a structure in which a device state reversibly changes depending on an application voltage to be applied to the light modulating optical device, wherein
incident light having a first waveband and incident light having a second waveband enters the light modulating optical device;
the light modulating optical device changes a transmittance or a reflectance of the light having the second waveband depending on the device state, without changing the transmittance or the reflectance of the light having the first waveband; and
light having emitted from the light modulating optical device enters a particular imager which is any one of the red light imager, the green light imager, and the blue light imager, which corresponds to the incident light.

2. The lighting unit according to claim 1, wherein
the incident light includes particular color component light which is any one of the red component light, the green component light, and the blue component light, and
the light modulating optical device has a function for controlling the color purity of the particular color component light.

3. The lighting unit according to claim 1, wherein
the light having the first waveband is particular color component light which is any one of the red component light, the green component light, and the blue component light,
the light having the second waveband is fourth color component light other than the red component light, the green component light, and the blue component light, and
the light modulating optical device has a function for controlling an amount of the fourth color component light.

4. The lighting unit according to claim 1, wherein
the incident light further includes light having a third waveband,
the second waveband is a waveband between the first waveband and the third waveband,
the light modulating optical device reflects light having the third waveband, and reflects both the light having the second waveband and the light having the third waveband when not transmitting the light having the second waveband,
each of the light having the first waveband and the light having the third waveband is any one of the red component light, the green component light, and the blue component light,
the light having the second waveband is fourth color component light other than the red component light, the green component light, and the blue component light, and
the light modulating optical device has a function for separating the light having the first waveband and the light having the third waveband from each other.

5. The lighting unit according to claim 1, further comprising a controlling unit configured to control modulation amounts of the red light imager, the green light imager, and the blue light imager based on a red input signal, a green input signal, and a blue input signal, respectively, wherein
the controlling unit controls an application voltage to be applied to the light modulating optical device based on the red input signal, the green input signal, and the blue input signal.

6. The lighting unit according to any one of claims 2 and 3, wherein a resolution of the light modulating optical device is lower than those of the red light imager, the green light imager, and the blue light imager.

7. The lighting unit according to any one of claims 2 and 3, wherein the light modulating optical device is an electrochromic device.

8. The lighting unit according to claim 4, wherein
the light modulating optical device includes: a cholesteric liquid crystal which transmits the light having the first waveband and which change the transmittance of the light having the second waveband depending on a change of the device state; and a dielectric multilayer film which reflects the light having the third waveband and which transmits the light having the first waveband and the light having the second waveband,
the cholesteric liquid crystals reflect the light having the second waveband when not transmitting the light having the second waveband; and
the dielectric multilayer film is provided on the light emitting side of the cholesteric liquid crystals.

9. A projection display apparatus comprising:
a light source configured to emit light including at least red component light, green component light, and blue component light;

a red light imager configured to modulate the red component light;
a green light imager configured to modulate the green component light;
a blue light imager configured to modulate the blue component light;
a color combining unit configured to combine light emitted from the red light imager, the green light imager, and the blue light imager;
a projection unit configured to project light combined by the color combining unit; and
a light modulating optical device configured to have a structure in which a device state reversibly changes depending on an application voltage to be applied to the light modulating optical device, wherein incident light having a first waveband and incident light having a second waveband enter the light modulating optical device,
the light modulating optical device changes a transmittance or a reflectance of the light having the second waveband depending on a change of the device state, without changing the transmittance or the reflectance of the light having the first waveband, and
light having emitted from the light modulating optical device enters a particular imager which is any one of the red light imager, the green light imager, and the blue light imager, which corresponds to the incident light.

* * * * *